United States Patent
Camp et al.

(10) Patent No.: US 11,068,811 B2
(45) Date of Patent: *Jul. 20, 2021

(54) SYSTEM AND METHOD FOR OPERATING A SERVICE TO ARRANGE TRANSPORT AMONGST PARTIES THROUGH USE OF MOBILE DEVICES

(71) Applicant: Uber Technologies, Inc., San Francisco, CA (US)

(72) Inventors: Garrett Camp, San Francisco, CA (US); Oscar Salazar, New York, NY (US); Travis Kalanick, San Francisco, CA (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 633 days.

This patent is subject to a terminal disclaimer.

(21) Appl. No.: 15/933,975

(22) Filed: Mar. 23, 2018

(65) Prior Publication Data
US 2018/0211194 A1  Jul. 26, 2018

Related U.S. Application Data

(63) Continuation of application No. 12/928,254, filed on Dec. 6, 2010, now Pat. No. 9,959,512.
(Continued)

(51) Int. Cl.
*G06Q 50/30* (2012.01)
*G06Q 10/06* (2012.01)
(Continued)

(52) U.S. Cl.
CPC ....... *G06Q 10/06311* (2013.01); *G06Q 10/02* (2013.01); *G06Q 10/025* (2013.01);
(Continued)

(58) Field of Classification Search
CPC ....... G06Q 10/02; G06Q 10/025; G06Q 50/30
See application file for complete search history.

(56) References Cited

U.S. PATENT DOCUMENTS 3,953,720 A   4/1976   Kelch
5,043,736 A   8/1991   Darnell
(Continued)

FOREIGN PATENT DOCUMENTS

CN   102402852   4/2012
CN   102496265   6/2012
(Continued)

OTHER PUBLICATIONS

Mukai et al., Dynamic Location Management for On-Demand Car Sharing System, 2005, In: Khosla R., Howlett R.J., Jain L.C. (eds) Knowledge-Based Intelligent Information and Engineering Systems. KES 2005. Lecture Notes in Computer Science, vol. 3681. Springer, Berlin, Heidelberg, pp. 768-744 (Year: 2005).*
(Continued)

*Primary Examiner* — Rupangini Singh
(74) *Attorney, Agent, or Firm* — Mahamedi IP Law LLP

(57) ABSTRACT

A system and method are described for enabling transportation to be arranged for individuals carrying handsets or mobile devices. In some embodiments, a customer can transmit a request for transport from a given customer geographic location. A service may handle the request by selecting a driver for the customer.

20 Claims, 6 Drawing Sheets

Related U.S. Application Data

(60) Provisional application No. 61/266,996, filed on Dec. 4, 2009.

(51) Int. Cl.
  *G06Q 10/02* (2012.01)
  *G06Q 30/02* (2012.01)
  *G06Q 30/06* (2012.01)
  *G06Q 40/00* (2012.01)

(52) U.S. Cl.
  CPC ........... *G06Q 10/06* (2013.01); *G06Q 10/063* (2013.01); *G06Q 30/0201* (2013.01); *G06Q 30/0202* (2013.01); *G06Q 30/0284* (2013.01); *G06Q 30/0601* (2013.01); *G06Q 40/12* (2013.12); *G06Q 50/30* (2013.01)

(56) References Cited

U.S. PATENT DOCUMENTS

| | | |
|---|---|---|
| 5,168,451 A | 12/1992 | Bolger |
| 5,293,642 A | 3/1994 | Lo |
| 5,862,244 A | 1/1999 | Kleiner et al. |
| 5,930,474 A | 7/1999 | Dunworth et al. |
| 6,057,831 A | 5/2000 | Harms |
| 6,339,745 B1 | 1/2002 | Novik |
| 6,356,838 B1 | 3/2002 | Paul |
| 6,417,856 B1 | 7/2002 | Tamura |
| 6,446,004 B1 | 9/2002 | Cao |
| 6,456,207 B1 | 9/2002 | Yen |
| 6,456,852 B2 | 9/2002 | Bar |
| 6,516,056 B1 | 2/2003 | Justice et al. |
| 6,519,463 B2 | 2/2003 | Tendler |
| 6,522,342 B1 | 2/2003 | Gagnon |
| 6,591,253 B1 | 7/2003 | Dinkin |
| 6,697,730 B2 | 2/2004 | Dickerson |
| 6,756,913 B1 | 6/2004 | Ayed |
| 6,804,658 B2 | 10/2004 | Lim et al. |
| 6,925,381 B2 | 8/2005 | Adamczyk |
| 7,064,681 B2 | 6/2006 | Horstemeyer |
| 7,089,110 B2 | 8/2006 | Pechatnikov et al. |
| 7,113,110 B2 | 9/2006 | Horstmeyer |
| 7,119,716 B2 | 10/2006 | Horstmeyer |
| 7,191,057 B2 | 3/2007 | Adamcyzk |
| 7,315,780 B2 | 1/2008 | Sugahara et al. |
| 7,319,414 B2 | 1/2008 | Horstmeyer |
| 7,394,386 B2 | 7/2008 | Nowlan |
| 7,395,140 B2 | 7/2008 | Christie |
| 7,412,042 B2 | 8/2008 | Henry |
| 7,412,715 B2 | 8/2008 | Kim |
| 7,434,177 B1 | 10/2008 | Ording et al. |
| 7,479,899 B2 | 1/2009 | Horstmeyer |
| 7,479,900 B2 | 1/2009 | Horstmeyer |
| 7,479,901 B2 | 1/2009 | Horstmeyer |
| 7,487,467 B1 | 2/2009 | Kawahara et al. |
| 7,504,966 B2 | 3/2009 | Horstmeyer |
| 7,528,742 B2 | 5/2009 | Horstmeyer |
| 7,538,691 B2 | 5/2009 | Horstmeyer |
| 7,482,952 B2 | 6/2009 | Horstmeyer |
| 7,552,063 B1 | 6/2009 | McEachern |
| 7,561,069 B2 | 7/2009 | Horstmeyer |
| 7,673,251 B1 | 3/2010 | Wibisono |
| 7,756,615 B2 | 7/2010 | Barfoot |
| 7,756,633 B2 | 7/2010 | Huang |
| 7,864,935 B2 | 1/2011 | Elliott |
| 7,869,945 B2 | 1/2011 | Huang |
| 7,876,239 B2 | 1/2011 | Horstmeyer |
| 7,970,533 B2 | 6/2011 | Huang |
| 7,974,779 B2 | 7/2011 | Huang |
| 8,036,824 B2 | 10/2011 | Huang |
| 8,068,037 B2 | 11/2011 | Horstmeyer |
| 8,086,400 B2 | 12/2011 | Huang |
| 8,099,085 B2 | 1/2012 | Lowry |
| 8,131,307 B2 | 3/2012 | Lubeck et al. |
| 8,140,256 B1 | 3/2012 | dos-Santos |
| 8,224,571 B2 | 7/2012 | Huang |
| 8,232,899 B2 | 7/2012 | Horstmeyer |
| 8,242,935 B2 | 8/2012 | Horstmeyer |
| 8,271,316 B2 | 9/2012 | Blackshaw et al. |
| 8,284,076 B1 | 10/2012 | Horstmeyer |
| 8,362,927 B2 | 1/2013 | Horstmeyer |
| 8,368,562 B2 | 2/2013 | Horstmeyer |
| 8,374,627 B2 | 2/2013 | Howard et al. |
| 8,386,593 B1 | 2/2013 | Gao |
| 8,531,317 B2 | 9/2013 | Horstmeyer |
| 8,554,608 B1 | 10/2013 | O'Connor |
| 8,564,459 B2 | 10/2013 | Horstmeyer |
| 8,775,938 B2 | 7/2014 | Rosser |
| 2002/0034292 A1* | 3/2002 | Tuoriniemi ........... G01S 5/0027 379/219 |
| 2002/0077905 A1 | 6/2002 | Arndt |
| 2002/0095326 A1 | 7/2002 | Katz |
| 2002/0138338 A1 | 9/2002 | Trauth et al. |
| 2002/0194129 A1 | 12/2002 | Furuya et al. |
| 2003/0040944 A1 | 2/2003 | Hileman |
| 2003/0043206 A1 | 3/2003 | Duarte |
| 2003/0087648 A1 | 5/2003 | Mezhvinsky et al. |
| 2003/0137435 A1 | 7/2003 | Haddad |
| 2004/0049424 A1 | 3/2004 | Murray |
| 2004/0054428 A1 | 3/2004 | Sheha et al. |
| 2004/0070602 A1 | 4/2004 | Kobuya |
| 2004/0093280 A1 | 5/2004 | Yamaguchi |
| 2004/0100479 A1 | 5/2004 | Nakano et al. |
| 2004/0106399 A1 | 6/2004 | Ki |
| 2004/0112959 A1 | 6/2004 | Jun |
| 2004/0155907 A1 | 8/2004 | Yamaguchi |
| 2004/0158483 A1 | 8/2004 | LeCouturier |
| 2004/0185842 A1 | 9/2004 | Spaur et al. |
| 2004/0219933 A1 | 11/2004 | Faith |
| 2004/0243430 A1 | 12/2004 | Horstmeyer |
| 2004/0249818 A1 | 12/2004 | Isaac |
| 2004/0254717 A1 | 12/2004 | Sugahara et al. |
| 2004/0254811 A1 | 12/2004 | Horstmeyer |
| 2004/0260470 A1 | 12/2004 | Rast |
| 2005/0091596 A1 | 4/2005 | Anthony et al. |
| 2005/0149382 A1 | 7/2005 | Fenner et al. |
| 2005/0227704 A1 | 10/2005 | Ferra et al. |
| 2005/0240512 A1 | 10/2005 | Quintero |
| 2005/0251333 A1* | 11/2005 | Adamczyk ........... G06Q 10/06 701/408 |
| 2005/0278063 A1 | 12/2005 | Hersh et al. |
| 2005/0278114 A1 | 12/2005 | Ahmad |
| 2006/0034201 A1 | 2/2006 | Umeda et al. |
| 2006/0048076 A1 | 3/2006 | Vronay et al. |
| 2006/0059023 A1* | 3/2006 | Mashinsky ........... G06Q 10/02 705/5 |
| 2006/0094447 A1 | 5/2006 | Zellner |
| 2006/0135134 A1 | 6/2006 | Mezhvinsky et al. |
| 2006/0136254 A1 | 6/2006 | Greenstein |
| 2006/0149681 A1 | 7/2006 | Meisner |
| 2006/0155460 A1 | 7/2006 | Raney |
| 2006/0161346 A1 | 7/2006 | Murakami et al. |
| 2006/0178949 A1 | 8/2006 | McGrath |
| 2006/0200306 A1 | 9/2006 | Adamcyzk |
| 2006/0200396 A1 | 9/2006 | Satterfield |
| 2006/0217885 A1* | 9/2006 | Crady ................... G01C 21/00 701/469 |
| 2006/0229778 A1 | 10/2006 | Obradovich et al. |
| 2006/0268100 A1 | 11/2006 | Karukka et al. |
| 2006/0271867 A1 | 11/2006 | Wang et al. |
| 2007/0073477 A1 | 3/2007 | Krumm et al. |
| 2007/0103342 A1 | 5/2007 | Milleville |
| 2007/0176796 A1 | 8/2007 | Bliss et al. |
| 2007/0197229 A1 | 8/2007 | Kalliola |
| 2007/0198276 A1 | 8/2007 | Hinrichs et al. |
| 2008/0005695 A1 | 1/2008 | Ozzie |
| 2008/0070593 A1 | 3/2008 | Hill |
| 2008/0076451 A1 | 3/2008 | Sheha et al. |
| 2008/0114629 A1 | 5/2008 | Pavlov |
| 2008/0125967 A1 | 5/2008 | Sprigg |
| 2008/0172173 A1 | 7/2008 | Chang et al. |
| 2008/0178116 A1 | 7/2008 | Kim |
| 2008/0189207 A1 | 8/2008 | Wurster |

(56) References Cited

U.S. PATENT DOCUMENTS

| | | |
|---|---|---|
| 2008/0195428 A1* | 8/2008 | O'Sullivan ............ G06Q 50/30 705/6 |
| 2008/0270019 A1 | 10/2008 | Anderson |
| 2008/0270204 A1 | 10/2008 | Poykko |
| 2008/0277183 A1 | 11/2008 | Huang |
| 2008/0288880 A1 | 11/2008 | Reponen et al. |
| 2008/0307512 A1 | 12/2008 | Tandon |
| 2009/0030885 A1 | 1/2009 | DePasquale et al. |
| 2009/0037101 A1 | 2/2009 | Koike |
| 2009/0049119 A1 | 2/2009 | Marcinkiewicz et al. |
| 2009/0083111 A1 | 3/2009 | Carr |
| 2009/0099971 A1 | 4/2009 | Salemme et al. |
| 2009/0106124 A1 | 4/2009 | Yang |
| 2009/0125228 A1 | 5/2009 | Dicke |
| 2009/0156241 A1 | 6/2009 | Staffaroni et al. |
| 2009/0171529 A1 | 7/2009 | Hayatoma |
| 2009/0171576 A1 | 7/2009 | Kim et al. |
| 2009/0172599 A1 | 7/2009 | Nezu |
| 2009/0176508 A1 | 7/2009 | Lubeck et al. |
| 2009/0177384 A1 | 7/2009 | Walder |
| 2009/0177385 A1 | 7/2009 | Matas et al. |
| 2009/0177502 A1 | 7/2009 | Doinoff et al. |
| 2009/0192851 A1 | 7/2009 | Bishop |
| 2009/0204920 A1 | 8/2009 | Beverley et al. |
| 2009/0216600 A1* | 8/2009 | Hill ........................ G06Q 50/30 705/7.14 |
| 2009/0222284 A1 | 9/2009 | McEachern |
| 2009/0254270 A1 | 10/2009 | Yu |
| 2009/0282353 A1 | 11/2009 | Halbherr et al. |
| 2009/0313077 A1 | 12/2009 | Wheeler |
| 2009/0326991 A1 | 12/2009 | Wei |
| 2010/0017275 A1 | 1/2010 | Carlson |
| 2010/0023246 A1 | 1/2010 | Zhao |
| 2010/0035596 A1 | 2/2010 | Nachman et al. |
| 2010/0070334 A1 | 3/2010 | Monteverde |
| 2010/0076988 A1 | 3/2010 | Kenedy et al. |
| 2010/0088026 A1 | 4/2010 | Manolescu |
| 2010/0115455 A1 | 5/2010 | Kim |
| 2010/0121689 A1 | 5/2010 | Wallace |
| 2010/0153292 A1 | 6/2010 | Zheng et al. |
| 2010/0182265 A1 | 7/2010 | Kim |
| 2010/0198453 A1 | 8/2010 | Dorogusker et al. |
| 2010/0199213 A1 | 8/2010 | Suzuki |
| 2010/0211340 A1 | 8/2010 | Lowenthal |
| 2010/0235085 A1 | 9/2010 | Kikuchi |
| 2010/0243724 A1 | 9/2010 | Golla |
| 2010/0228415 A1 | 11/2010 | Paul |
| 2010/0299436 A1 | 11/2010 | Khalid |
| 2011/0010300 A1 | 1/2011 | Audet |
| 2011/0050588 A1 | 3/2011 | Li |
| 2011/0052110 A1 | 3/2011 | Kim |
| 2011/0060480 A1 | 3/2011 | Mottla |
| 2011/0069017 A1 | 3/2011 | Victor |
| 2011/0099040 A1 | 4/2011 | Felt et al. |
| 2011/0060600 A1 | 5/2011 | Fox et al. |
| 2011/0112952 A1 | 5/2011 | Annunziata |
| 2011/0137696 A1 | 6/2011 | Meyer et al. |
| 2011/0137699 A1 | 6/2011 | Ronen et al. |
| 2011/0153192 A1 | 6/2011 | Lin |
| 2011/0153453 A1 | 6/2011 | Ghafoor |
| 2011/0153495 A1 | 6/2011 | Dixon |
| 2011/0177845 A1 | 7/2011 | Fasold |
| 2011/0197131 A1 | 8/2011 | Duffin et al. |
| 2011/0208732 A1 | 8/2011 | Melton et al. |
| 2011/0218992 A1 | 9/2011 | Waldman et al. |
| 2011/0221765 A1 | 9/2011 | Nason et al. |
| 2011/0238690 A1 | 9/2011 | Arrasvuori |
| 2011/0283223 A1 | 11/2011 | Vaittinen |
| 2011/0307282 A1 | 12/2011 | Camp |
| 2011/0313880 A1* | 12/2011 | Paul .................... G06Q 30/0631 705/26.7 |
| 2012/0041675 A1 | 2/2012 | Juliver |
| 2012/0084676 A1 | 4/2012 | de Paz |
| 2012/0130627 A1 | 5/2012 | Islam et al. |
| 2012/0179764 A1 | 7/2012 | Erdal |
| 2012/0203599 A1 | 8/2012 | Choi |
| 2012/0225671 A1 | 9/2012 | Lubeck et al. |
| 2012/0226390 A1 | 9/2012 | Adams |
| 2012/0232943 A1 | 9/2012 | Myr |
| 2012/0239452 A1 | 9/2012 | Trivedi et al. |
| 2012/0313965 A1 | 12/2012 | Mochizuki et al. |
| 2012/0323642 A1 | 12/2012 | Camp |
| 2012/0327009 A1 | 12/2012 | Fleizach |
| 2012/0330778 A1 | 12/2012 | Eastham |
| 2013/0024249 A1 | 1/2013 | Zohar et al. |
| 2013/0041720 A1 | 2/2013 | Spires |
| 2013/0050131 A1 | 2/2013 | Lee |
| 2013/0132140 A1 | 5/2013 | Amin |
| 2013/0132246 A1 | 5/2013 | Amin |
| 2013/0132887 A1 | 5/2013 | Amin et al. |
| 2013/0162627 A1 | 6/2013 | Gabara |
| 2013/0191141 A1 | 7/2013 | Chun |
| 2013/0204676 A1 | 8/2013 | Hindi et al. |
| 2013/0268406 A1 | 10/2013 | Radhakrishnan et al. |
| 2013/0290040 A1 | 10/2013 | Perry et al. |
| 2014/0026065 A1 | 1/2014 | Wang |
| 2014/0047346 A1 | 2/2014 | Karamchedu |
| 2014/0051465 A1 | 2/2014 | Ruys et al. |
| 2014/0067491 A1 | 3/2014 | James |
| 2014/0129135 A1 | 5/2014 | Holden et al. |
| 2014/0129302 A1 | 5/2014 | Amin et al. |
| 2014/0172727 A1 | 6/2014 | Abhyanker |
| 2014/0180732 A1 | 6/2014 | Rotchin |
| 2014/0180733 A1 | 6/2014 | Rotchin |
| 2015/0012341 A1 | 1/2015 | Amin |
| 2015/0046080 A1 | 2/2015 | Wesselius et al. |
| 2017/0186056 A1 | 6/2017 | Amin |
| 2018/0211194 A1 | 7/2018 | Camp |
| 2019/0220778 A1 | 7/2019 | Murano et al. |

FOREIGN PATENT DOCUMENTS

| | | |
|---|---|---|
| CN | 102682593 | 9/2012 |
| GB | 2367979 | 4/2002 |
| JP | 2001/188996 A | 7/2001 |
| JP | 2002/024659 A | 1/2002 |
| KR | 10-2005-0015772 | 2/2005 |
| KR | 10-2009-0109044 | 10/2009 |
| KR | 10-1006599 | 1/2011 |
| WO | WO99/44186 | 9/1999 |
| WO | WO 2002/006994 | 1/2002 |
| WO | WO2010/056923 | 11/2009 |
| WO | WO 2011/014076 | 3/2011 |

OTHER PUBLICATIONS

EESR in EP 19165275.9 dated Apr. 18, 2019.

Walsh, HTML5 Link Prefetching, Jul. 7, 2010, https:// davidwalsh. name/html5-prefetch.

Gill et al., AMP: Adaptive Multi-stream Prefetching in a Shared Cache, Dec. 19, 2006, https://www.usenix.org/ legacy/events/fast07/ tech/full_papers/gill/gill_html/ amp-html.html.

Gill et al., AMP: Adaptive Multi-stream Prefetching in a Shared Cache—Introduction, Dec. 19, 2006, https://www.usenix.org/ legacy/ events/fast07/tech/full_papers/gill/gill_html/ node1.html.

International Search Report and Written Opinion, International Application No. PCT/US2010/059152, dated Mar. 28, 2011, pp. 1-11.

Examination Report for Australian Application No. 2010325793, dated Jun. 21, 2013.

Search Report dated Oct. 1, 2013, for related EP Application No. 10835261.8.

Alfred Round et al. "Future Ride: Adapting New Technologies to Paratransit in the United States", Working Paper, UCTC No. 306, University of California Transportation Center, 51 pages.

International Search Report and Written Opinion, International Application No. PCT/US2013/68025, dated Apr. 15, 2014, pp. 12.

Shigematsu et al. "AVM System", Fujistu Ten Technical Journal No. 33, 27:34, (2009).

Uber iPhone app update 1.0.48, Jun. 27, 2011, http:/blog.uber.com/ 2011/06/27/uber-iphone-app-update 1-0-48.

(56) References Cited

OTHER PUBLICATIONS

International Search Report and Written Opinion, International Application No. PCT/US2015/056703 dated Feb. 2, 2016.
Chinese Search Report dated Jun. 22, 2016 in CN 2013800627666.
Kikuchi, et al., "Advanced Traveler Aid Systems for Public Transportation", US Department of Transportation, Sep. 1994.
Fu, et al., "On-Line and Off-Line Routing and Scheduling of Dial-a-Ride Paratransit Vehicles", Computer-Aided Civil and Infrastructure Engineering 14 (1999).
Edward W. Walbridge, "Real-Time Ridesharing Using Wireless Pocket Phones to Access the Ride Matching Computer", 1995 IEEE.
EESR in EP 10835261.8 dated Oct. 10, 2016.
2nd Office Action in CN 201380062766.6 dated Jan. 3, 2017.
Examination Report No. 2 for Australian Application No. 2015202596 dated May 22, 2017.
Examination Report No. 1 for Australian Application No. 2016210772 dated Nov. 14, 2017.
Office Action in European Application No. 13853639.6 dated Jun. 11, 2018.
Examination Report No. 2 for Australian Application No. 2016210722 dated Jul. 27, 2018.

\* cited by examiner home screen pickup request pickup accepted begin trip end trip open for requests / fare

SYSTEM AND METHOD FOR OPERATING A SERVICE TO ARRANGE TRANSPORT AMONGST PARTIES THROUGH USE OF MOBILE DEVICES

CROSS-REFERENCE TO RELATED APPLICATIONS

This application is a continuation of U.S. patent application Ser. No. 12/928,254, filed Dec. 6, 2010, which claims the benefit of priority to U.S. Provisional Patent Application No. 61/266,996, filed Dec. 4, 2009; the aforementioned priority applications being hereby incorporated by reference in their respective entireties.

TECHNICAL FIELD

Embodiments described herein pertain generally to a system and method for operating a service to arrange transport amongst parties through use of mobile devices that are carried by the respective parties.

BACKGROUND

Current fleet management systems employed for taxi and limousine fleet typically utilize onboard metering devices, radios, and cell phones to dispatch drivers and monitor fares. Such systems typically are not communicative to customers that are waiting for pickup. Furthermore, little information is tracked about individual fares. Moreover, conventional approaches rely on the customer making payment directly to the driver, by credit card or cash.

DETAILED DESCRIPTION

Figure 1:
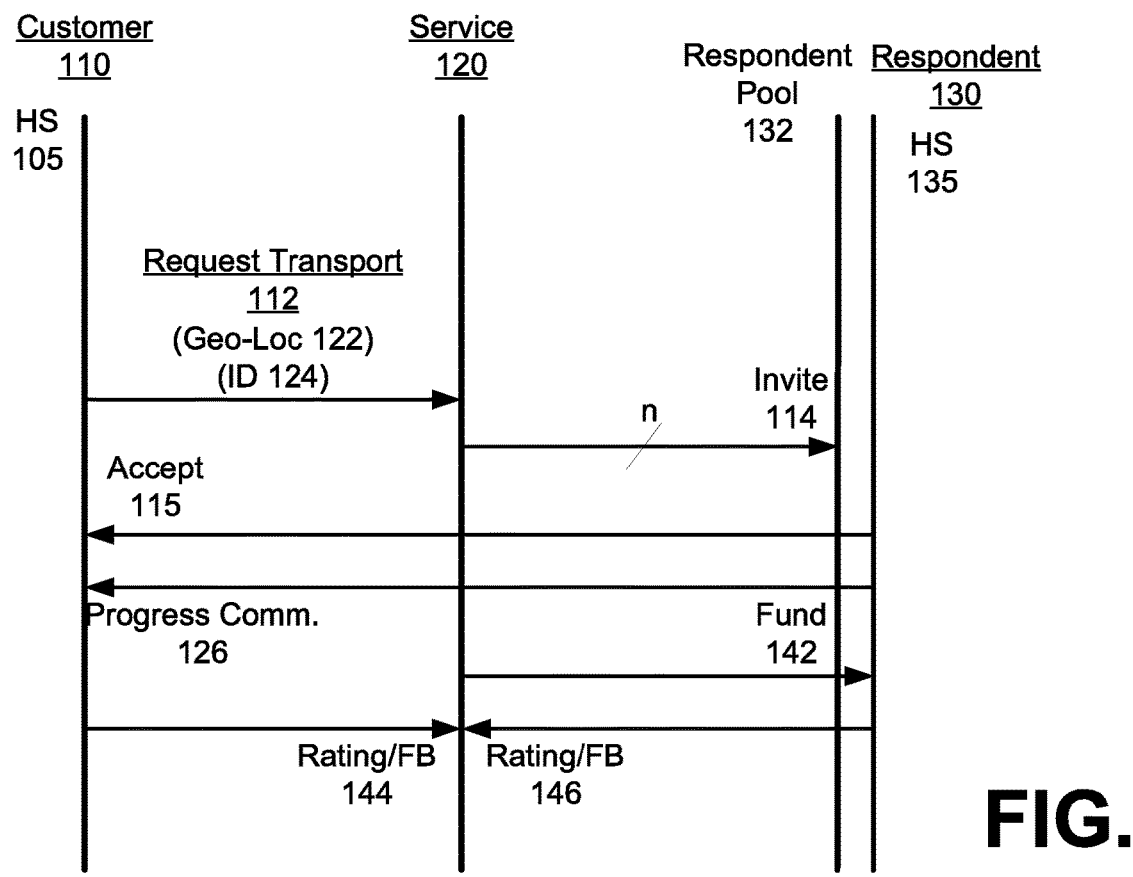
FIG. 1 illustrates a system for enabling transport to be arranged between parties that are at different geographic locations, according to one or more embodiments.

A system and method are described for enabling transportation to be arranged for individuals carrying mobile devices (e.g. handsets). In some embodiments, a customer can transmit a request for transport from a given customer geographic location. A service may handle the request by selecting a party to provide transport to the customer. According to some embodiments, the pairing of the party to the customer requesting the transport is performed programmatically and/or automatically, based on parameters such as the location of the driver (or a vehicle of the transport party).

Some embodiments provide that a location of the customer is communicated to a service and/or driver using programmatic resources of the customer's handset.

According to embodiments, individual drivers may be selected as respondents to a customer request, whom in turn have the option to accept the assignment. Once a driver (or alternatively, transport party) is selected and has accepted the assignment, information about the driver (e.g. the location of the driver when the fare was accepted, a picture of the driver, his rating etc.) may be communicated to a device of the customer (e.g. to the customer's handset). The driver may also be provided information about the customer (e.g. the picture of the customer, the customer's rating, the customer's precise location).

Additionally, some embodiments provide that the customer is provided updates as to the location of the vehicle of the driver en route to the customer. The updates may be provided in real-time or near-real time, to reflect the progression of the driver towards the customer.

Among other benefits, embodiments recognize that transport services often have vehicles that have down-time because they are between fares. In particular, limousine (or black cabs) spend much of their operational time being idle, as conventional dispatching services for such drivers often significantly underutilize the individual drivers. In contrast to conventional approaches, embodiments provided herein enable the operators of the vehicles to field transport requests from, for example, their handsets. The handsets (or other mobile devices) may correspond to, for example, (i) cellular telephony or data devices (e.g. APPLE IPHONE) that run a program that is part of a transport platform, and/or (ii) roaming devices that can connect to access points (e.g. hot spot) or operate under other wireless networks (e.g. WiMax). When the drivers/respondents are free (e.g. between fares), they can operate the program on their devices to field transport requests. Customers may run a program of the same platform on similar handsets or devices, in order to make requests for transport from their respective location. A service (such as provided online, through use of a server) may select a respondent/driver (or transport), and perform some intermediary functions (such as make payment). Various parts of the transport transaction, in which a customer is picked up and transported to a desired location, are handled programmatically, through computing resources of the platform. As explained in more detail, embodiments employ such programmatic components in order to facilitate the ability of customers to request transport, as well as to facilitate transport providing parties and customers to meet at the pickup site and to conduct their business.

Among other features, at least some embodiments provide that the geographic location of the respective parties is determined programmatically using geo-aware resources. This information is communicated to the other party without need for manual involvement by the party operating the handset. Thus, for example, when the customer makes the request for transport, his location at the time of making the request can automatically be included in the request. Further, when the respondent/driver accepts the fare and starts to travel to the customer, his location and other relevant information (such as continuously updated estimated time of arrival) can be automatically communicated to the customer.

According to some embodiments, the fare for the transport is determined automatically, using a program platform that is shared by the devices of both customer and driver. Moreover, the customer's funds may be automatically accessed and transferred to the driver/respondent. Thus, the driver is provided an incentive in participating in the platform, by being assured that funds for services will be received.

Still further, embodiments provide that each party is able to provide a rating or feedback of the other party for the transaction. Thus, if either party has a particularly good or bad experience with the other party, they can record a rating that affects the reputation of the other party in using the service. In this way, both parties can be motivated to perform and behave well, thereby increasing the quality of the experience to both customer and driver.

Still further, embodiments enable a system such as described to be implemented using commercially available handsets and devices. Examples of devices that may be operated by customers or respondents (e.g. drivers) include multifunctional cellular telephony devices (e.g. APPLE IPHONE, devices that operate the Android operating system), and wireless network enabled devices such as laptops, netbooks or tables (e.g. iPAD). As such, specialized devices or components are not needed. Customers who wish to use a transport service such as described need to only download or otherwise run a program on a suitable handset. Likewise, drivers who wish to participate need only to run a corresponding program on a similar handset.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

FIG. 1 illustrates a system for enabling transport to be arranged between parties that are at different geographic locations, according to some embodiments. In an embodiment, a customer 110 (also referred as to a customer) is able to make a request to receive metered automobile transport services using a computing device. A transport service 120 locates a respondent 130 (also referred to as 'respondent' or 'driver') from a pool of possible respondents, in order to drive the customer 110 to a desired destination.

According to some embodiments, the customer 110 operates a handset 105 to generate a request for transport 112. As described in FIG. 2, the handset 105 may include roaming network capabilities (e.g. network interface for cellular network, Wireless Fidelity 802.11 (a), (g) (n), or WiMax etc.), along with geo-aware resources (e.g. GPS). The network functionality enables the handset 105 to transmit request 112 and communicate further with service 120 or respondents 130. The geo-aware resources enable the handset to automatically include geographic identification information 124 that identifies the geographic location of the customer 110 when making the request 112. The handset 105 may also be configured to include identification information that identifies the customer 110 to either the service 120 or to the respondent 130. The identification information 124 includes, for example, a name, account number, a rating, and/or picture of the customer making the request 112. A destination address may also be included or provided with the identification information 124.

According to an embodiment, the service 120 processes the request 112 in order to select candidate respondents that can provide the requested transport. The service 120 is able to use identification information 124 to identify an account or profile of the user. The account or profile of the user may include or identify (i) funds for payment for transport services, (ii) rating information that identifies a reputation or class of user of the customer 110. Other information that may optionally be associated or maintained with the user account/profile includes, for example, an image of the customer, preferences of the user (e.g. type of vehicle the user prefers), the rating of the user (which may be provided by drivers that have previously interacted with), and historical information such as previous drivers that have provided transport to the user. Such preferences, rating information, historical information and other profile information can be used to select drivers for the user at a given instance. For example, for a given fare request, the service may first attempt to locate a driver that the user has previously used (and perhaps provided a good rating for).

As an alternative or addition, some or all of the account/profile information may be stored with the user, and communicated as part of the user's request.

Service 120 uses information contained in the customer request 112 to select candidate respondents 132 based on one or more criteria. The criteria may include (i) proximity of the individual candidate respondents to the customer 110, (ii) a class or rating of the candidate respondent 132, based on reputation and/or level/quality of service (such as provided by rating/feedback of past instances), (iii) availability of the candidate respondents 132. As mentioned, the criteria may also include user-specified preferences, including specific identification by the user of a particular driver, or previous drivers that have serviced the user and whom have received good feedback from the user. In order to arrange transport to the customer, an embodiment provides that the service 120 implements a pairing process upon receipt of the request 112. The service 120 performs the pairing process by (i) using the one or more criteria to select a first candidate respondent; (ii) sending an invitation 114 to the first candidate, and giving the first candidate a short duration to accept the invitation; (iii) if the first candidate respondent declines or fails to accept the invitation, selecting a second candidate respondent using the one or more criteria; (iv) sending the invitation 114 to the second candidate, and giving the second candidate a short duration to accept. The pairing process may be repeated (n times) until a respondent 130 from the candidate pool 132 communicates back an acceptance 115 to the invitation 114.

As an alternative to a single pairing process, another embodiment provides for selecting drivers by contacting a set of two or more drivers at once, based on criteria such as described above. The particular driver that ultimately is selected may correspond to, for example, the first driver in the set to respond and accept the invitation.

Either as part of the invitation 114, or in a follow on communication (following acceptance 115 of the invitation), the service 120 may specify, to the selected respondent 130, information about the customer 110 that includes: (i) the reputation of the customer (e.g. the user's feedback as provided by other drivers), (ii) the expected fare of the transport for that customer (which may include determining and communicating the customer's destination), and/or (iii) the geographic location of the customer. The customer's picture or other identification information may also be communicated to the accepting respondent. Thus, for example, the respondent 130 is able to identify the customer 110 from sight when he arrives to pick up the customer.

According to embodiments, the pool of respondents 132 are equipped with devices that can communicate with geo-aware mobile devices (e.g. handsets) of the customers. In particular, the pool of respondents 132 may include portable/mobile and personal handsets 135, such as cellular voice/data devices with geo-aware resources that the respondents can carry with them into and out of their vehicles. In one embodiment, the handsets 135 of the candidate respondents share a platform (e.g. application level) with the handsets 105 used by the customers. The shared platform enables each party to exchange communications across a shared functionality and user-interface.

Once the respondent 130 starts traveling to the customer 110, a series of progress communication 126 are communicated to the customer 110. The progress communications 126 may be generated automatically, using program instructions that cause the handset to utilize its geo-aware resources to automatically generate location information of the respondent 130 as it progresses en route to the location of customer 110. The progress communications 126 are communicated to the customer 110 using network communications. The progress communications 126 may be communicated directly from the respondent 130 to the customer 110, or via the service 120.

On pickup, the customer 110 and the respondent 130 are each facilitated in that identification information for each party has been communicated to the other. This identification information may include the picture of the other party.

According to an embodiment, once the respondent 130 picks up the customer 110, one or both devices can be used to perform fare monitoring functions. The fare monitoring functions enable the calculation of the fee that the customer will have to pay when he is driven to his desired destination. In an embodiment, the fee determination is based on the distance or route travelled and/or the time that the customer 110 is in the vehicle. The fee determination may also be determined based on a formula or factor that is specific to a particular transport party (e.g. the transport) company or service. Stop and wait times may be calculated, either by monitoring the GPS information communicated from the metering device, or from use of accelerometers that are sometimes included in the hardware of the handset. Numerous other parameters may be used to determine the fee for the fare, as described with embodiments and variations of FIG. 3-5.

In an embodiment, payment is automatic. The customer 110 may store or associate an online fund account with his device 105. Likewise, the driver (or alternatively the transport party) has an associated account for receiving funds. Once the customer 110 is driven to his desired destination, service 120 (or the devices as configured) can trigger transfer of out of the customer's account. In one embodiment, the funds are transferred from the customer's account to an account of the service, which then transfers funds to compensate the respondent party that provided transport. The distribution of the funds from the customer may be distributed to the service 120, as well as a transport party transport that can correspond to either the driver, or a business entity that provides the driver (e.g. fleet operator). The fee transferred from the service to the transport is based on the fee charged to the customer, but may include reductions for use of the service. Various payment schemes may be used to compensate the transport party, such as paying the transport party a percentage of the fare, or compensating the transport party based on various parameters that include quality of service, desirability of fare, or even hourly. As a variation or alternative, the service can trigger at least a portion of the funds to be transferred from the customer's account directly to the transport party (e.g. fleet operator or driver). Thus, the fund transfer can be accomplished by moving funds from the customer's online financial account to that of the service and/or respondent 130 (e.g. a commercial account for the fleet manager or company). In an embodiment, fund transfer communication 142 is directed to the respondent 130 to confirm that payment has been made. The fund transfer communication 142 may be made in response to the respondent/driver (and/or the customer 110) signaling via the respective handset that the fare is over. As mentioned with other embodiments, some or all of the actual funds may be distributed to an account associated with either the driver or the transport party (e.g. the entity that employs the driver).

After the customer 110 is driven to the desired destination, an embodiment enables one or both parties to provide feedback about the other. The customer 110 may provide a rating or feedback 144 to service 120, to rate, for example, the customer's experience with the particular driver. Likewise, the driver can provide a rating or feedback 146 for the customer 110. The service 120 may associate profiles or accounts with each of the customer 110 and respondent 130 (or respondent party), and the rating/feedbacks 144, 146 may affect the overall rating of the customer/respondent. Thus, the reputation of the customer 110 or the driver 130 may be influenced by the feedback provided by the other party.

According to some embodiments, a service such as described by FIG. 1 can be implemented using handsets or other portable computing devices, in a manner that overlays or compliments existing dispatching/metering equipment used by conventional services for limousines and taxicabs. For example, limousine drivers can carry commercially available handsets (e.g. APPLE IPHONE) that are configured to implement a system such as shown in FIG. 1, in order to field pickup requests from customers using handsets (also configured as described above and elsewhere in the application), while at the same time using conventional fleet/taxi dispatch and metering equipment for carrying out fares that are made through conventional channels. Thus, an embodiment such as described with FIG. 1 and elsewhere can provide an alternative but complimentary mechanism by which fleet drivers can be assigned fares. In some embodiments, the drivers may utilize conventional meters to determine fares that are initiated through conventional channels, and use the suitably configured mobile device or service to determine the fares when providing transport via the service such as described by FIG. 1. It is possible for different fare calculation formulas and rules to be used to determine fares with conventional meters as opposed to those determined through the use of handsets or devices (as described above).

Moreover, embodiments such as described by FIG. 1 may be implemented to utilize drivers regardless of the specific hardware or equipment implemented by fleet companies. Thus, embodiments such as described need not be limited by disparities in the dispatch system or equipment used amongst different fleets or transport companies that service a common geographic region. Rather, drivers from different fleet networks can be made part of the same service through use of a suitably configured commercially available handset.

Figure 2:
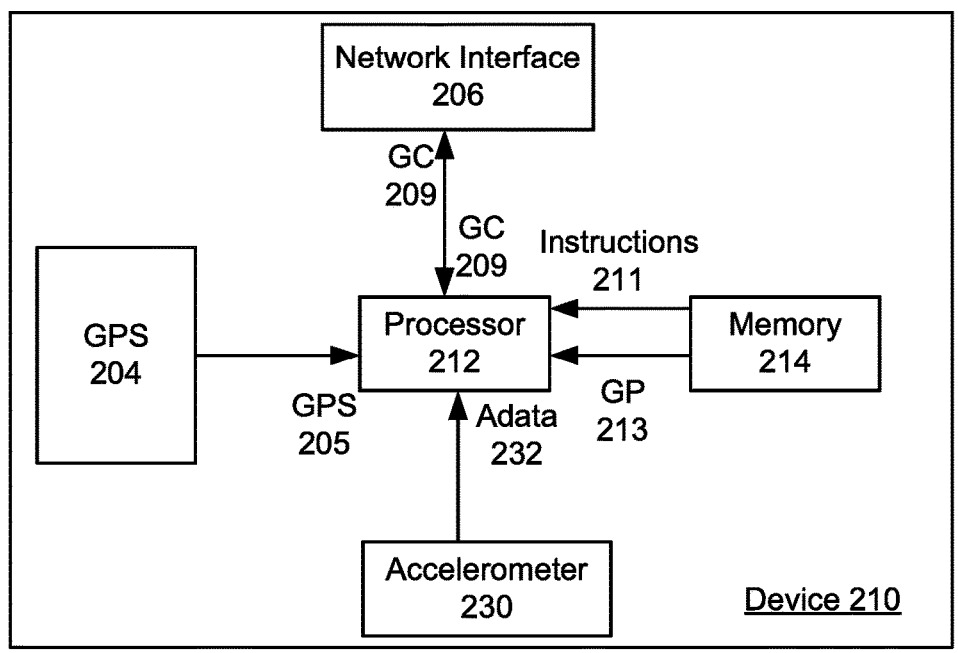
FIG. 2 illustrates a mobile computing device that can be used by either customers or respondents, in implementing a system such as described with FIG. 1.

FIG. 2 illustrates a mobile computing device that can be used by either customers or respondents, in implementing a system such as described with FIG. 1. Accordingly, mobile computing device 210 may be illustrative of the customer handset 105 (see FIG. 1) or the respondent handset 135 (FIG. 1). Accordingly, the mobile device 210 may correspond to any one of the following: multi-functional cellular telephony/data device, wireless tablet device, netbook, laptop, or GPS computing device.

Computing device 210 includes GPS component 204, network resources 206, processor 212, and memory resources 214. Other components that may be included with the computing device 210 include, for example, sensors such as accelerometer 230. In one implementation, the network resources 206 includes one or more modules for enabling wireless connectivity. The wireless modules may include radios or modems, as well as software or logic for enabling network ports and interfaces through use of the radios. The network resources can include, for example, a cellular data/voice interface to enable the device to receive and send network communications over a cellular transport, including communications to service 120 (see FIG. 1) and/or to the other party. In implementing one or more embodiments, the device may transmit, for example, device identification (e.g. cellular number) and geo-aware communications (as described below). As an alternative or variation, the network resources 206 includes a wireless network interface for connecting to access points (e.g. Wireless Fidelity 802.11(g) or 802.11(n)) or for using other types of wireless mediums (e.g. WiMax).

In an embodiment, device 210 uses the geo-aware resources, shown in form of Global Positioning System (GPS) component 204, as well as network resources 206 to communicate with the service 120 or the respondents 130 (FIG. 1) over cellular or other roaming networks. The device 210 can use the processor(s) 212 and memory resources 214 execute a program (or corresponding) functionality for either a customer or driver/respondent. In some embodiments, the same type of mobile computing device 210 may be used for handsets 105 of customers and respondents 130, but the programming functionality on the handsets may vary for the respective parties.

In one embodiment, the processors 212 execute programming instructions 211 in order to auto-locate and transmit geo-location information to the service 120 or to the device of the other party in the transaction. This functionality (as provided by programming instructions 211) enables geo-aware communications 209 to be transmitted from the device. The geo-aware communications 209 may correspond to the customer's request for transport 112 (FIG. 1), in which geographic information 122 is automatically included with the request 112. This functionality also allows for geo-aware communications 209 from the driver respondent 130, which automatically communicate its geographic information of the driver in progress communications 126 (FIG. 1) to the customer 110. In some embodiments, the programming instructions 211 exist in the form of an application that communicates with a transport service such as described with an embodiment of FIG. 3. The application may execute to utilize various resources of the device, such as the geo-aware resources or accelerometer (as described below), to generate requests that automatically include information for transport requests, such as customer identification and geographic location.

The device 210 also includes geo-presentation resources 213, to enable mapping or similar presentations using geographic identification information. For example, maps can be stored and/or retrieved on the device to present the position of either party at a given moment. The on-device GPS unit 204 may provide GPS coordinates 205 to the processor, which then uses the geo-presentation resources 213 to present 'real-time' maps of the user's position. The processor 212 may also receive GPS coordinates 215 from over a network (via the network interface 206) and use geo-presentation resources 213 and the received GPS coordinates 215 to present the location of the other party at a given instance.

According to an embodiment, device 210 includes an accelerometer 230 that provides accelerometer information 232 to the processor 212. The accelerometer information 232 can be used by the processor 212 to determine metering information, particularly with regard to stop or waiting time. More specifically, an embodiment provides that the processor 212 uses the GPS data 205 and the accelerometer information 232 to determine (i) position information, such as pickup and drop-off locations and route information or distance traveled, and (ii) stop/wait time. When used by the customer, the processor 212 may perform the metering function to validate or confirm the fare. The driver/respondent may also use the information to determine the fare.

Figure 3:
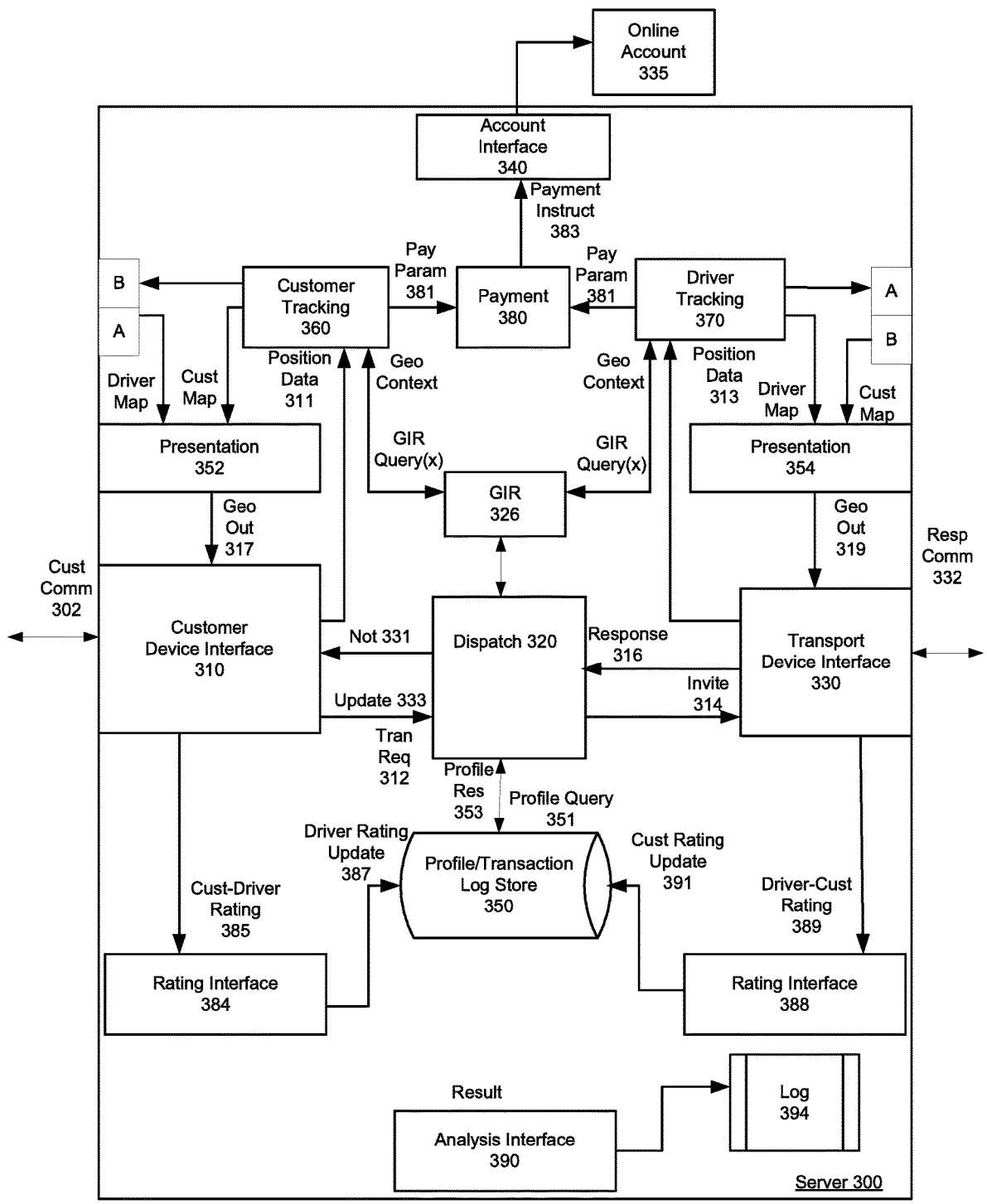
FIG. 3 illustrates components for implementing a service, such as described with other embodiments.

FIG. 3 illustrates components for implementing a service, such as described with other embodiments. In an embodiment, a transport service (e.g. service 120 of (FIG. 1) is implemented on server (or servers) 300 to arrange transport for customers by pairing drivers to customers. Server 300 may include customer interface 310, dispatcher 320, account interface 340, and respondent interface 330. The customer interface 310 may be used to handle customer communications 302, while respondent interface 330 is used to handle respondent communications 332. The overall service provided on the server 300 includes a dispatcher (sub) component 320 which pairs a driver (or transport party) with a customer in response to a customer request. The server 300 also includes tracking components 360, 370 which track (or monitor position and status) of the customer and the driver when the fare request is initiated (e.g. when the driver is en route to the customer) and when the fare is ongoing (driver is delivering customer to destination). A presentation component 352, 354 may be provided to generate a graphic user interface for each of the customer and the driver prior to and after pickup. Payment component 380 may be included to handle automatic payment for the fare by the customer. These components are described in greater detail below.

Dispatch, Driver Selection and Pickup

According to embodiments, dispatch component 320 implements a selection process that results in a driver being paired to a customer, who has made a request for transport. In an embodiment such as shown, the customer request is generated programmatically, such as by way of the customer operating a user interface of a handset to make the request.

On the server 300, customer interface 310 receives the transport request 312 from a given customer, and uses the dispatcher 320 to select a respondent for invitation 314. The transport request 312 may communicate a pickup location of the customer. The pickup location can be included in the transport request 312 manually (e.g. the user specifies an address for the pickup operating a handset), or automatically (e.g. based on the users known position via the GPS information communicated from his handset). As discussed below, position data 311 can be procured programmatically and automatically from the customer when the service is in use, based on the GPS information of the user's device. Similar position data 313 may be maintained for the driver when he is available for customer pickup, as well as when he is engaged to pick up and deliver a customer to a destination location. Once the transport is initiated, the position data 311, 313 may be used to determine a route taken, or intermediate positions between the pickup and drop-off locations.

The dispatch component 320 responds to the transport request 312 from the customer. In responding, the dispatch component 320 may identify relevant parameters, such as the pickup location (or the location of the customer), as well as profile information about the customer (e.g. customer rating, customer preferences etc.). In response to receiving the request 312, the dispatch component 320 may also identify the customer, and obtain profile information 353 from the profile database 350. More specifically, as mentioned in some embodiments, server 300 (as part of service 120 FIG. 1) maintains profile information about each of the participants of the service. The profile information may be maintained in a profile store 350. Examples of information that may be maintained in the profile store 350 include overall rating/feedback of either party, commentary feedback (such as complaints), name or identity information, credit card information, logs of transactions (showing, for example, the average fare requested by a customer).

Thus, the profile information 353 may be stored in a database or similar data structure, and dispatch component 320 may query 351 the database for information about the customer, based on the identity identified from the request 312 or other customer communication 302.

In selecting the driver for a given customer, dispatch 320 includes information to identify the pickup location in the invitation 314 that is communicated to the one or more drivers. As discussed previously, multiple invitations 314 may be used to progressively select a driver respondent for the customer, using criteria that includes (i) proximity of the customer to the candidate respondent, (ii) rating or class association of the driver and/or the customer, (iii) user preference for a particular driver, driver or vehicle class, or other characteristic of the driver or transport; and/or (iv) alternative business logic (e.g. driver bidding process for the fare). In order to handle transport requests and make invitations, the server 300 may require use of geographic information resource (GIR) 326 that identifies, for example, proximity by distance or time of individual drivers to the requesting customer. The geographic information may also be used to identify the geographic location of individual parties based on their communicated GPS information. The geographic information resource may include maps or codes that enable locating parties from their GPS coordinates, as well as information needed for calculating time/distance separating the two parties. The dispatch component 320 may also identify profile information 353 about the individual drivers by, for example, querying 351 the database 350.

In one embodiment, dispatch component 320 sends out multiple invites 314 to multiple drivers, in response to transport request 312 communicated via customer device interface 310 (which may receive the customer communication 302). The invitations 314 may be sent in parallel (e.g. concurrently), or in series (sent to one driver, who can then accept or not, then sent to another driver). Each of the initially selected drivers is a candidate, selected based on parameters such as proximity, rating, preference etc. The candidate driver that is selected to handle the transport may communicate response 316, via the driver device interface 330 (which receives the driver communication 332). Dispatch 320 may then communicate (i) a notification 331 that informs the customer of the driver selection (including optionally, information about the driver, such as his picture, vehicle identification, rating, and current position); and (ii) updates 333 that convey information about the position of the driver en route to the pickup location and/or estimated time of arrival.

Customer Pickup

According to embodiments, once the customer is picked up, position data 311, 313 is obtained from the handsets of each of the customer and driver (via the respective device interfaces 310, 330). A customer tracking component 360 uses the position data 311 to track the customer by position and time. Similarly, the driver tracking could component 370 uses the position data 313 to track the driver by position and time. The GIR 326 can be used to place the user's position data 311 and the drivers position data 313 in context to mapping information and other geographic resources. The server 300 implements presentation component 352, 354 for the customer and the driver. The respective customer and driver tracking components 360, 370 communicate the position information of customer and driver to the presentation component 352, 354 for output to the user. The output of the respective presentation components 352, 354 may be a geographic output, such as one that would combine the position data 311, 313 of each of the customer and driver with mapping information. In one implementation, the geographic output 317, 319 is communicated to the customer and driver devices via the device interface 310 and 330, respectively. Thus, under one implementation, both customer and driver are able to view the progress of the fare after pickup.

Payment

The server 300 includes logic for facilitating payment between customer(s) and the relevant transport party for a particular fare. According to some embodiments, payment of the customer's transport is performed automatically, or substantially automatically (i.e. with minimal user input, such as confirmation by the user that the fare is to be paid), in response to completion of the transport. Still further, some embodiments provide that the completion of the transport can be detected automatically, based on, for example, the position data 311 of the customer relative to the position data 313 of the driver. For example, if the customer leaves the transport vehicle and does not return to the vehicle after a set duration, a determination may be made that the transport has been completed. This determination may be made by, for example, customer and/or driver tracking component 360, 370.

As an alternative or addition, some embodiments provide that one or both parties to the transport can signify that the transport has been completed with some action, such as providing input via the handset. As another example, the customer can enter rating information for the driver, which then can be interpreted as signifying the completion of the transport.

The payment component 380 may receive payment location parameters 381 from one or both of the customer/driver tracking components 360, 370. The location payment parameters 381 may include (i) the pickup location of the customer, (ii) the drop-off location of the customer, (iii) the route or intermediate position of the vehicle between the customer pickup and drop-off locations, and/or (iv) the duration of the transport. Other location payment parameters may also be used by the payment component 380, such as whether toll fees were incurred (which can be determined from position data 311, 313 cross-referenced with information provided by GIR 326), and the type of the vehicle used (e.g. can be determined by the profile information 350 of the driver). Other parameters may also be used, including parameters on predicted or actual market demand, vehicle availability, time of day, rating of driver, type of vehicle, and quality of service (see description provided by FIG. 4).

The payment component 380 may implement one or more algorithms to determine the fare for the transport, based on the location payment parameters 381 and/or other parameters or conditions (e.g. market demand, time of day etc.). Additional descriptions of how payment algorithms can be implemented are described with FIG. 4 and FIG. 5.

Once the fare for the transport is determined, the payment component 380 may communicate an instruct 383 to account interface 340. The instruct 383 identifies the amount of the transport, the customer (or customers) that are to provide the amount, and the transport party that is to be credited for the fare.

In one implementation, the account interface 340 may be used to process and transfer funds from an online account of the customer to an online account of the transport service (provided by the server 300). In turn, the transport service may utilize one or more methodologies to compensate the relevant transport party. The relevant transport party can correspond to a business entity (e.g. company) that operates the vehicle, or which employs the driver. Alternatively, the relevant transport party may correspond to the driver, who can, in some variations of embodiments described, receive funds from the service. The transport service, may for example, compensate the transport party by (i) distributing a portion (e.g. 50%) of the compensation to the transport party; (ii) pooling funds from multiple transports of the transport party, then transferring the funds (which can represent a portion of the total funds received) to the transport party; (ii) compensating the transport party based on an alternative metric such as flat fee or hourly rate. Embodiments further recognize that many situations, the transport party corresponds to an entity that operates one or more vehicles (e.g. fleet), and is separate entity from the driver. In such embodiments, implementations provide that the transport party is compensated with one payment (for driver or operating entity) or multiple payments (separate payments for driver and operating entity). In still another variation, the transport service may delineate a tip portion of the payment of the customer, and compensate the driver separately for the tip portion.

Accordingly, account interface 340 is capable of interfacing with online transactional accounts on behalf of either the customer 310 or the transport party/respondent. As an alternative, the server 300 may maintain credit card information for customers and use that information to pay the transport party/driver.

According to some embodiments, when the fare is complete, server 300 automatically, without approval from the customer, pays the respondent. In this way, the respondents are encouraged to accept the transport requests, in that payment for services is assured. The customer may have the option to tip. Whether the customer tips or not may reflect back on the customer by the respondent's rating/feedback.

Feedback

Some embodiments enable the participants of the transport service to provide feedback about one another based on their respective experiences. As mentioned elsewhere, one embodiment provides that each participant (customer and driver) can provide feedback that includes a rating or other quantative metric. Additionally, a user can provide qualitative statements, such as sentences or paragraph-formed commentary about his experience with the driver.

With reference to FIG. 3, a rating interface 384, 388 may be provided for each of the customer and the driver. The rating interface 384 of the customer enables the customer to record feedback 385 about a driver, or more generally, about the transport party (e.g. driver or the taxi or limousine company that provided the transport). Likewise, the rating interface 388 enables the driver to record feedback about the customer 389. The rating information of each participant may be recorded as part of that user's profile information, and thus stored in the profile store 350. Thus, each feedback results in a respective driver rating update 387 (provided by the customer) or customer rating update 391 (provided from the driver).

In some embodiments, the rating interface 384, 388 is provided in part as a webpage or webform that the user can interact with to record information about the other participant in the transaction. Still further, the rating interface may be presented to the user upon completion of the transport, such as pushed (or accessible) to the user's handset (via web browser or app). Numerous alternatives and variations are possible in regard to enabling the participant (customer or driver) to enter rating and other feedback.

Other forms of feedback may also be collected in addition to, for example, overall ratings. For example, the transport service may prompt the customer to answer a series of yes or no questions as a means of evaluating the performance of a particular driver. The questions may ask, for example, whether the driver was courteous, whether the driver opened the door or assisted the customer in entering the vehicle, the manner in which the driver drove the vehicle, and the driver's response time. The user's questionnaire feedback may be recorded for the particular driver and/or the company or operator that provided the driver.

Once entered, the rating information can have a variety of uses. Rating information can influence, for example, the ability of a customer to pick up a driver when the pool of drivers is limited. A customer's rating may be based on factors such as whether the customer provided a decent tip, and was courteous. A "good tipper" can be identified from the rating information, and when the good tipper needs transport, available drivers are more likely to accept his fare.

On the driver side, the rating information associated with a driver may reflect the driver's courtesy, driving manner etc. The transport service 300 may prioritize (or emphasize) selection of drivers with good ratings. For example, the invite 314 may first be sent to proximate drivers with highest ratings, then proximate drivers with middle tier ratings. Still further, some embodiments provide the user with the ability to reject the driver based on, for example, the driver's rating information.

As still another variation, the rating information may be used as a parameter in selecting one driver to be paired to a customer. In such an embodiment, customers may first be paired with drivers with similar ratings.

Log and Data Usage

Still further, embodiments enable collection and dissemination of data that can promote or facilitate transport services for both customers and drivers. A transport service such as described with FIG. 1 or FIG. 3 may collect and utilize information determined from customers and drivers for a variety of purposes. Among the types of information that can be collected, the location of potential customers may be determined based on location information transmitted from suitably configured customer handsets. For example, service 120 (FIG. 1) may identify a location (e.g. city block, street address) of a conglomeration of customer handsets during a given time interval. Numerous inferences may then be made about the conglomeration. For example, the conglomeration may be identified as a social event or hot-spot in the city at the given time interval. This information can then be shared with other customers, or with a portion of the population that may want to know where, for example, the 'night life' in the city is in a given evening. Drivers and fleet operators (including conventional transport providers who may not use handsets) may be informed of the location where customer pickups may readily be available.

Other types of information that may be collected, disseminated or otherwise used includes (i) popular pickup locations (e.g. to assist transport providers as to locations to patrol or be near for pickups), (ii) popular destinations, (iii) estimated travel times through to a given destination, or through a particular part of a city (e.g. to estimate traffic). Thus, the collection and dissemination/use of this and other information may be collected to provide additional services, or to enhance transport providers in providing service.

With reference to FIG. 3, information pertaining to the various transports that are transacted through the transport service are recorded for a given duration of time. The recorded information may identify customer pickup locations, customer drop-off locations, time of transport, duration of transport, and/or routes taken. In the example shown, the recorded information is stored in a log 394. The information may be recorded from, for example, dispatch 320 (identify customer pickup locations), the customer tracker 360 and driver tracker 370 (record pickup and drop-off locations, routes taken, duration), and/or the payment component 380 (record fares paid, tips paid etc.).

From the recorded information, various kinds of analysis can be performed. An analysis component 390 may analyze information from the log 394 to identify information for users (customers and drivers) of the transport service, as well as to direct users who may research based on information recorded by the transport service. The analysis component 390 may provide output to users on, for example, a website.

Figure 6:
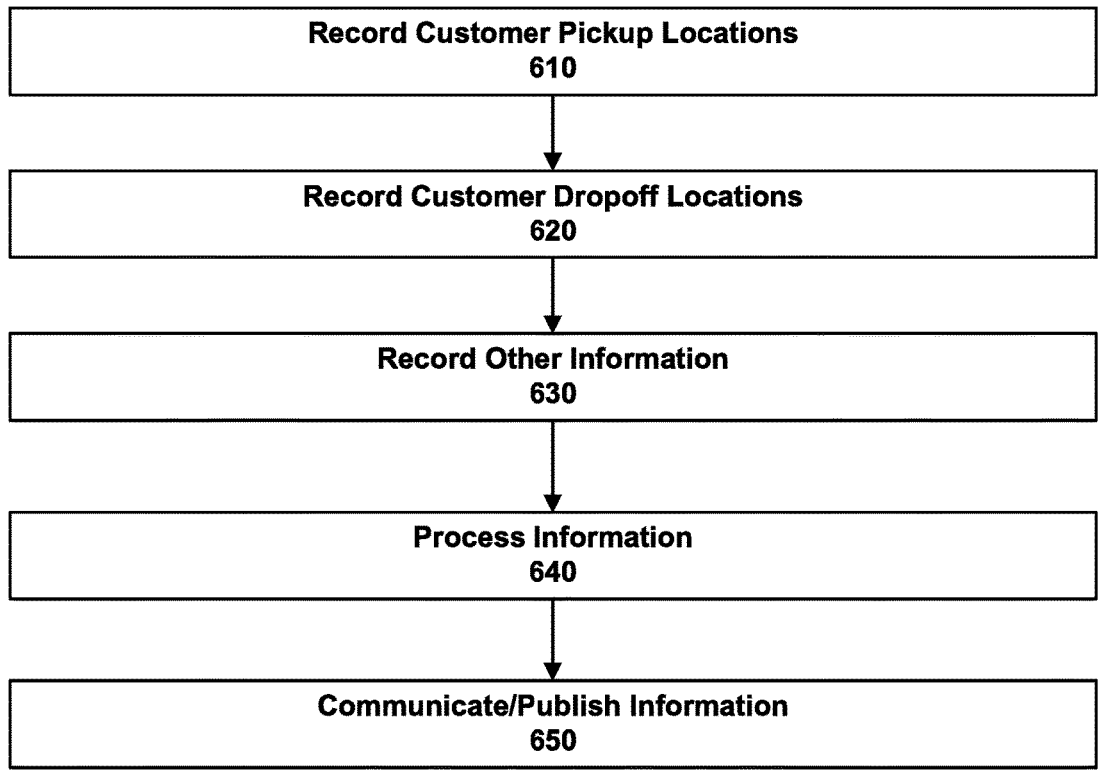
FIG. 6 illustrates a method for processing data determined from monitoring transport amongst parties located at different locations, according to one or more embodiments.

According to some embodiments such as described with FIG. 6, the information from the log includes historical and/or real-time information that is published to third-parties and/or a population. For example, the publication may be in the form of communications sent directly to third-parties, such as vehicle transport providers. Alternatively, the information may be published on, for example, a website or made available to users that operate a mobile application. For parties such as customers, the information may identify the location of transport vehicles, as well as popular spots in a given geographic region. For vehicle transport services and providers, the information may predict likely areas where there are likely to be fares, thus facilitating the vehicle transport services and providers in positioning vehicles and drivers to reduce response times to customer transport requests.

As another example, web users can utilize the site to identify traffic spots or best routes by identifying routes taken by drivers of the transport service, as well as their actual transport time (versus expected or average).

Numerous other applications for such data exist. For example, common pickup locations may be analyzed by time, date or event to facilitate taxi services in knowing where to locate themselves in their off time. Similar information can identify information relevant to other business or social settings of a city. For example, hotel occupancy can be estimated by identifying the number of drop-offs at hotels.

Historical information may also be utilized to predict likely transport request times and locations. For example, the most common pickup times in a given region of a city at a particular time of year can be determined.

Payment Methodology

Figure 4:
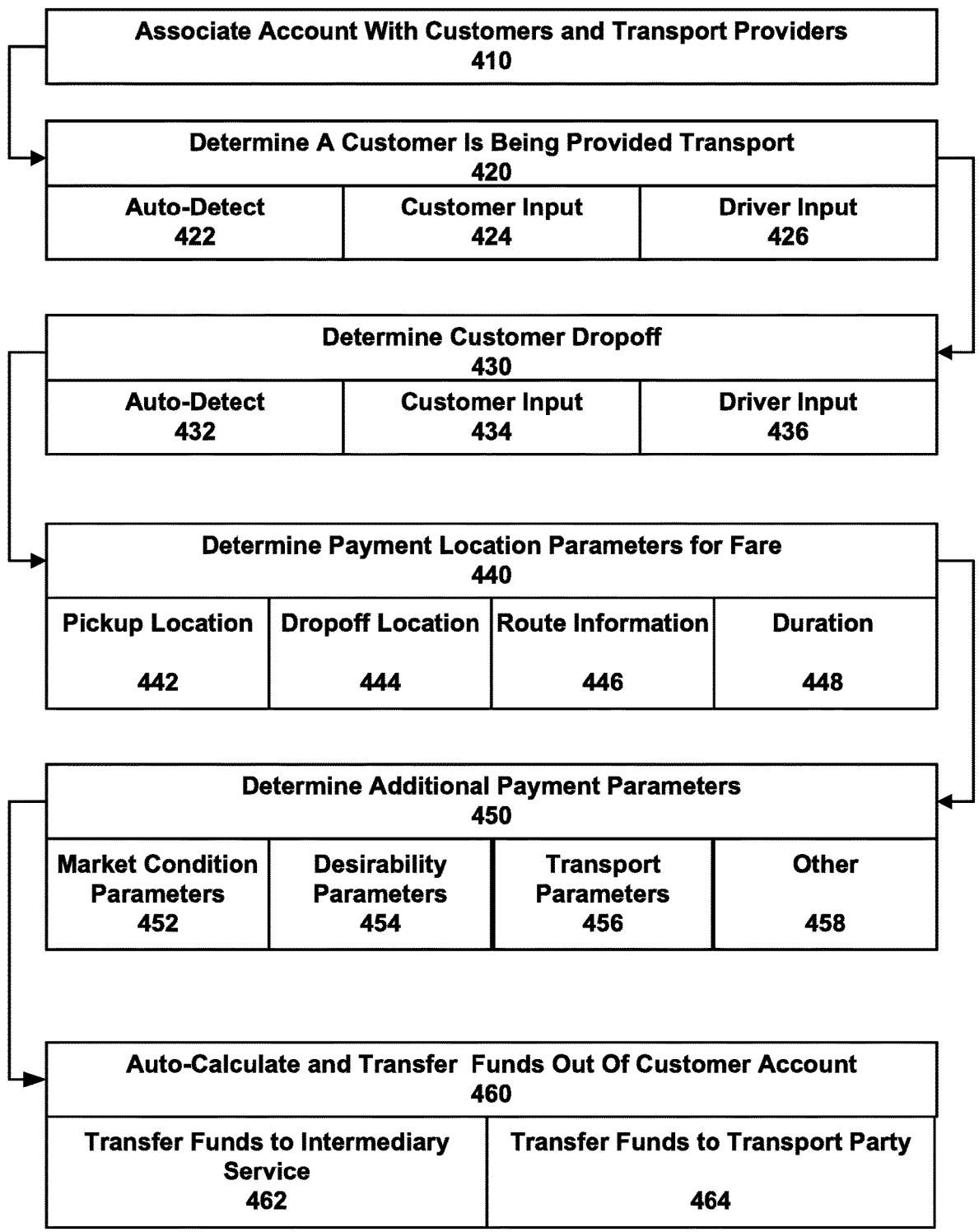
FIG. 4 illustrates a process for programmatically transferring funds from a customer to a relevant transport party as a mechanism for compensating the transport party, according to an embodiment.

FIG. 4 illustrates a process for programmatically transferring funds from a customer to a relevant transport party as a mechanism for compensating the transport party, according to an embodiment. A method such as described by FIG. 4 may be implemented using components such as described with FIG. 3. Accordingly, reference is made to components of FIG. 3 for purpose of illustrating suitable components for performing a step or sub step being described.

Customers may subscribe to participate in a transport service such as described with FIG. 3. For customers, their participation may include (i) establishing an account with funds, and (ii) registering and/or enabling a device to utilize the service of server 300. For drivers, their participation may involve (i) establishing an account to receive funds, and (ii) registering and or enabling a device to utilize the service of server 300. In one embodiment, the devices used by the participants correspond to handsets that run applications ("app") for participating in the transport service described. Other types of devices may also be used, such as laptops, tablets, computers, or other GPS enabled devices that have network connectivity. It should also be noted that embodiments contemplate use of more primitive devices, such as those that only enable cellular telephony communications and/or SMS.

In this environment, participants (customers and transport providing parties) are associated with accounts (410). In the case of the customers, the accounts include funds that can be used for transfer to a driver. For example, the customer may make payments through a specific transport service account that is managed by the transport service entity. The payments may be made, for example, in advance, periodically, or when prompted (such as by the transport service in response to the customer receiving the transport). The transport service (such as implemented on the server(s) 300) may have authority to automate transfer of funds from an account of the customer that is not under the control of the transport service (e.g. checking account, credit card account, PAYPAL account).

As provided with other embodiments, the relevant transport party that is to receive compensation from the fare (directly from the service) can, depending on the implementation and the payment methodology, correspond to (i) the fleet or vehicle operator (e.g. limousine company or entity), and/or (ii) the driver. The transport party may establish or associate an account to receive funds from the transport service and/or account of the customer. Each account may also be associated with profile information of the respective participant, including the identity of the participant.

The transport service determines when the customer is being provided transport by driver (420). This determination may be made based on factors that include the customer requesting pickup, and a transport service selecting a particular driver. However, embodiments further recognize that not all transport requests may end up as fares. Thus, embodiments include the ability to auto detect when the customer and driver have actually initiated the transport (422). Such detection can be implemented in one of many possible ways. For example, the position of the transport providing vehicle and customer can be compared over duration of time while the two are moving, and if they are at the same position, the significance is that they are determined to be in the same vehicle. As an alternative or addition, accelerometers incorporated into the handsets of the customer and/or driver may detect linear motion, such as provided by motion of a vehicle. This information can also be used to detect a fare pickup, or to confirm as such. As an alternative or addition, customer input (424) or driver input (426) may be used to determine when the fare has started.

In addition to detecting the pickup, one or more embodiments detect the completion of the transport (430). Similar to pick up, this determination may be made automatically (432), or by way of input from either the customer (434) or the driver (436). Automatic detection of the transport completion can be made by comparing relative position data 311, 313 (e.g. as determined from GPS of devices) of the customer and transport vehicle, respectively. For example, if the position data 311, 313 indicates that the customer and transport vehicle have separated in position, and a designated duration of time has passed by which the customer does not return to proximity of the transport vehicle, then a determination may be made that the fare is complete.

As still another variation, once the fare pickup is detected as being present, a wireless signal (e.g. Bluetooth detection and/or pairing) may be used to determine that the two devices are in very close proximity to each other (e.g. front seat and backseat of vehicle). The completion of the transport may correspond to such wireless signal indicating the two devices have separated.

As mentioned with pickup, manual input may also be used, such as by the customer (434) or the transport party (436). For example, one party may have lost battery life, in which case manual input from the other party is needed to signify end of transport.

Once the transport is complete, the location payment parameters for the fare are determined (440). The location payment parameters can include, but are not limited to, the customer pickup location (442), the customer drop-off location (444), route information (or intermediate positions between the pickup and drop-off locations) (446), and/or the duration of the transport (448). Other location parameters can include the type of vehicle used (e.g. sedan versus stretch limo), presence of tolls or other costs, and even the transport route that is used.

As an addition or alternative to use of location payment parameters, some embodiments determine the fare price using alternative parameters (450). The alternative parameters include market condition parameters (452). Market condition parameters may correspond to metrics that estimate or predict availability and demand for transport at a particular duration corresponding to when the customer requests transport. In one implementation, the demand may be based on (i) determining the pool of candidate parties or respondents that are in service in the particular duration, and (ii) determining the number of drivers that are engaged by customers at the given duration. For example, during peak hours, the number of transport providing vehicles may be a maximum. Rates for transport services may be higher or at peak than low demand hours. Still further, the fare value may weight or prioritize demand for transport independently. For example, when demand is at peak, rates for transport services may be higher.

Demand can be determined from real-time information maintained by the transport serve. For example, the log 394 may at a given instance identify the number of available vehicles, and the number of transports that are engaged or in service. As an alternative or addition, the demand may be predicted from historical analysis, such as estimations of demand during particular hours of weekdays, weekends, or holidays.

As a variation or alternative to market parameters, desirability parameters may be used to determine the fare value (454). Desirability parameters may correspond to the type of vehicle or transport provided. For example, the luxury limousines may result in a higher fare value than non-luxury sedans. The desirability of the transport may also include parameter such as whether ride sharing is permitted, whether on-board entertainment or amenities or provided etc. Desirability parameters may also correspond to rating parameters of the transporting party (either the company or driver). Such rating parameters may designate higher ratings for transport providing parties (or drivers) that have higher ratings. The fare value may also be affected by the customer rating. For example, customers may have higher ratings or class designations (e.g. VIPs), and with such designation, the fare for that customer may be reduced.

As another variation, some embodiments may base the fare value on transport evaluation parameters. The transport service may evaluate the quality and kind of the transport that the customer received from the driver. The evaluation may be based on criteria such as (i) the response time of the driver to arrive at the pickup location, (ii) the transport time, (iii) whether the driver elected the fastest or best route to the drop-off location. Other considerations include whether amenities were provided to the customer (or whether the customer actual used the amenities), as well as feedback by the customer as to specifics of the transport (e.g. the driver was courteous, opened the door, the car was clean, the driver obeyed driving laws etc.).

Other parameters may also be used to determine the fare value. Such other parameters may include bids that the transport service receives from the transport providing parties for fares at select locations, times or for particular drivers or vehicles.

From the payment parameters, the fare for the transport is calculated and transferred from customer to driver (460). In one embodiment, the fare is calculated and accessed from the customer account, in response to a determination that the transport is complete. Alternatively, the transfer of the fare may be performed substantially automatically, such as by way of prompting the customer and/or driver to perform some action or otherwise provide confirmation upon determining that the transport has been completed.

As mentioned with other embodiments, various methodologies may be used to distribute funds from the customer to the various entities that are involved in providing the transport to the customer. In one embodiment, the transport service collects the funds and distributes funds to the pertinent transport parties periodically, or responsively, after one or more fares are collected. The sum total of the fares that are distributed to the transport party may represent a portion of the total received. As an alternative, the funds (or portion thereof) collected from the customer can be transferred directly to the transport party. In the context provided, the transport party may correspond to the operator or company that provides the drivers. Thus, the drivers may be compensated by separate arrangements with the operator or company that provides the transport (e.g. their employers). Still as another variation, some funds may be distributed from the transport service to the drivers separate from the companies that employ the drivers (e.g. the tip portion). Numerous variations are possible for distributing funds collected from customers, depending on considerations for distributing collected funds from the customer.

With reference to embodiments described above, the parameters used to determine the fare value may include numerous variations. In one embodiment, the fare value may be based on the route of the transport, as defined by the customer pickup location, the customer drop-off location and intermediate points there between. In another embodiment, the general geographic locality where the transport service operates (e.g. a city) may be 'fenced' geographically into multiple pre-defined regions. The fare value from one fenced region to another may be pre-determined. Thus, only the pickup and drop-off locations may be used to determine the fare value. In addition to location parameters, other parameters set by market conditions, desirability of other parameters may influence the fare value (e.g. adjust it up or down), or even provide the primary factor for determining the fare value.

Figure 5:
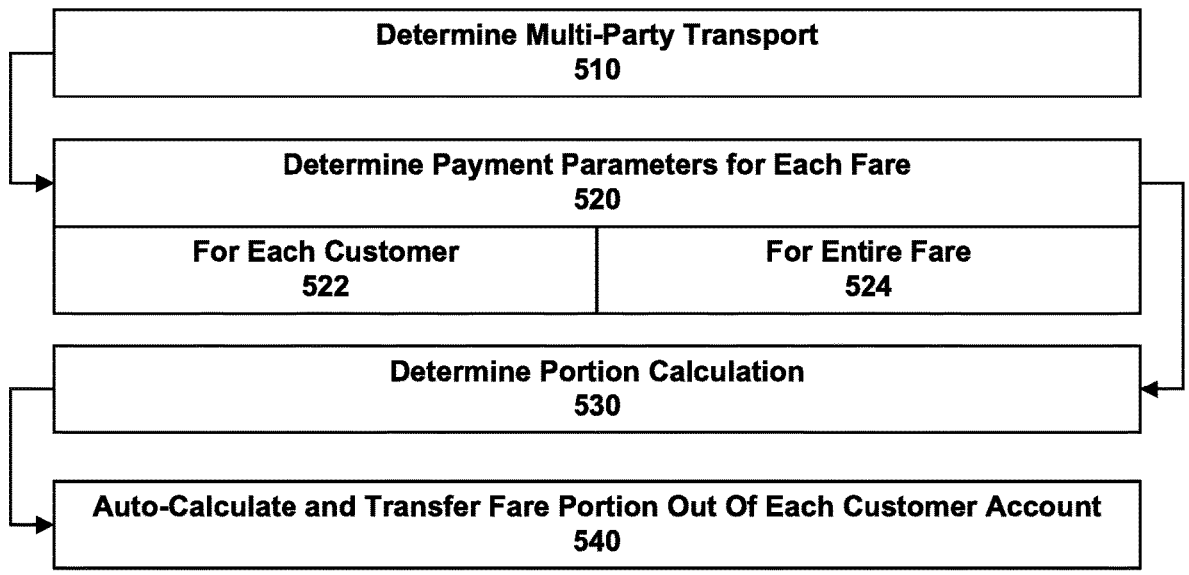
FIG. 5 illustrates a process for enabling fee splitting amongst multiple customers that share a transport, according to one or more embodiments.

FIG. 5 illustrates a process for enabling fee splitting amongst multiple customers that share a transport, according to one or more embodiments. Conventionally, fee splitting in transport situations (e.g. limos, taxis) is informal and dictated by agreement amongst the customers. The time it takes for customers to work out a fee arrangement is inefficient. Furthermore, conventional approaches have an underlining assumption that parties sharing rides know one another, and thus are comfortable discussing fee arrangement. In contrast to such approaches, an embodiment of FIG. 5 enables transport to be arranged for multiple parties in a manner previously described by other embodiments. Additionally, the transport service can be used to determine the fee portion of each party sharing the transport, and further prompt or automate the transfer of funds from each party without requiring the individuals to agree or discuss the arrangement. Among other benefits, the fee payment arrangement can be implemented with minimal involvement from the parties. It is also easier for a transport party to provide a vehicle to pickup more than one party for transport, even if the parties are not acquaintances, as the fee splitting is not an issue that needs to be resolved by the individuals.

With reference to an embodiment of FIG. 5, the transport service determines that a particular transport is shared by more than one customer (510). The determination can be made in various ways. First, the transport service can be configured to detect when individuals that are participants of the service enter a vehicle that is also operating under the service. For example, such individuals may have handsets that each runs an application which communicates with the server 300. The presence of each individual in the same vehicle may be determined in a manner described with, for example, FIG. 4 (e.g. see 410). When multiple individuals are in one of the transport vehicles, the transport service may assume the fee splitting arrangement is to take place.

Alternatively, the assumption may be a parameter that is weighted against other parameters, such as whether the individuals entered the vehicle at the same time, whether they have shared rides in the past or whether they are dropped off at the same location. As another variation or alternative, the fee splitting may be implemented after individuals in the transport perform a designated action. This designated action can correspond to the individuals responding to a prompt delivered to their respective handsets. As an alternative, the users may "bump" devices. Bumping can trigger an accelerometer to register the event, and the event can signify some action like fee splitting. Numerous actions can be performed to enable the transport service to infer fee splitting is in place.

Once the transport is partially complete (some but not all of the customers are dropped off) or fully complete (all of the customers are dropped off), the payment parameters for the fare of each customer can be determined (520). The payment parameters may be customer-specific (524) and/or collective (528) for the fare, depending on the algorithm that is implemented. Customer-specific payment parameters include (i) pickup-location of each customer (if different), (ii) drop-off location of each customer (if different), and/or (iii) ride duration of each customer between their respective pickup and drop-off locations. Collective ride parameters include the starting point (first pickup) of the transport and the finishing point (the last drop-off), as well as the total distance and/or time of the transport from start to finish.

The portion of the fee is calculated for each customer based on the determined payment parameters (530). The particular payment parameters, weighting and/or other factors used in determining the proportioning amongst the customers can be a matter of implementation.

According to some embodiments, the fare portion attributable to each customer is then withdrawn from each user's associated online account and transferred to an account of the transport service, or the transport party (depending on the implementation). The payment transfer may be performed automatically, substantially automatically (e.g. prompt user to confirm payment) or manually. For example, in some cases, the user may have to pay cash or by credit.

FIG. 6 illustrates a method for processing data determined from monitoring transport amongst parties located at different locations, according to one or more embodiments. A method such as described by FIG. 6 may be implemented using components such as described with FIG. 3. Accordingly, reference is made to components of FIG. 3 for purpose of illustrating suitable components for performing a step or sub step being described.

Embodiments recognize that utilizing mobile devices with geo-aware resources and communicative capabilities to arrange transports enable significant data collection and usages. A transport service such as described with FIG. 3 may arrange transport for multiple vehicle transport services, such as different limousine operates in a designated city. In doing so, instances of customer pickups and drop-offs may be recorded, including recording the pickup locations (610) and drop-offs (620). The information may be recorded in the log 394. In some embodiments, the information may be recorded in real-time, although the information may be stored for use as historical data.

Other information may also be recorded from, for example, by monitoring vehicles available for transport, and/or transports in progress (630). For example, the location of available vehicles may be determined, as well as the duration of transport between locations.

The recorded information is processed (640). In real-time applications, the information current information at a given instance is extracted from the log and processed in accordance with a particular application. One application includes presenting geographic information about popular customer pickup and/or drop-off locations. For example, a map may be generated that identifies the location of or popular recent customer pickups, recent or popular customer drop-offs, current location of available transport vehicles, predicted response times, and predicted areas of traffic congestion.

As another application, historical information from the log 394 may be used to predict demands for transport during given time spans (e.g. weeknights, weekends, between 2-4 pm on Thursdays etc.). The historical information may include customer pickup locations, pickup times, customer drop-off locations and/or drop-off times. This information may be processed to determine predicted demands for transport at given locations and times.

The processed information is then communicated or published to third-parties (650). For example, the transport service may publish the processed information on, for example, a website that is available to customers and transport provides. Alternatively, the information may be published through applications that execute on user devices. As still another example, the information may be generated in the form of reports that are emailed or otherwise communicated to parties (e.g. transport providing parties) directly. Numerous other variations are possible.

Figure 7A:
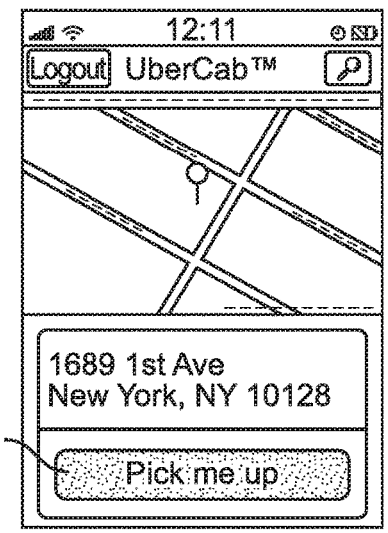
FIG. 7A through FIG. 7F illustrate examples of a series of user-interfaces that are displayed to a customer as transportation is requested and provided, according to an embodiment.

FIG. 7A through FIG. 7F illustrate examples of a series of user-interfaces that are displayed to the customer from the time he requests transport to the time he arrives at his destination. As mentioned, a system such as described with FIG. 1 and/or FIG. 3 may be implemented on handsets operated by customers and respondents. The customer may operate a program on the handset to select transport. FIG. 7A shows a presentation and interface, depicting an embodiment in which the customer is shown his location and a soft button or icon (any mechanical or programmatic input may be used) to initiate the transport request. The presentation and interface may be generated on the customer device by an application, such as mobile app that is configured to communicate with a transport service. Alternatively, the presentation and interface may be made through, for example, a browser of the device, which connects to a specific website or network location to generate the presentation (or execute an application for generating the interface). In making the request, an embodiment provides that the customer need only trigger the soft-feature (or other input mechanism). Once the soft-feature is triggered, the application (or programming) automatically determines the information that is to be provided with the request, such as the location of the customer (as determined from the GPS resources of the device), the identity of the customer (as stored for use with the application), and other information (e.g. such as picture of the customer). Thus, the customer does not need to enter the address, but can compose and send the request for transport, along with information to identify the geographic location of the customer, with a simple soft-press or icon selection.

Figure 7B:
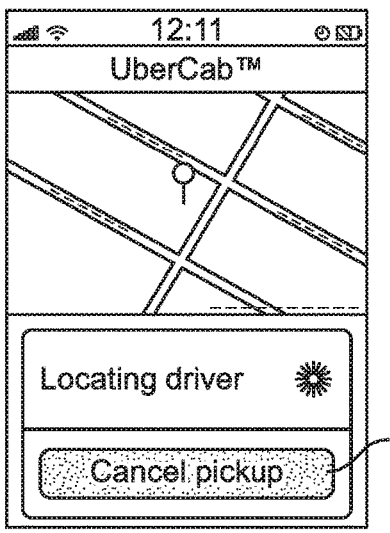
Figure 7C:
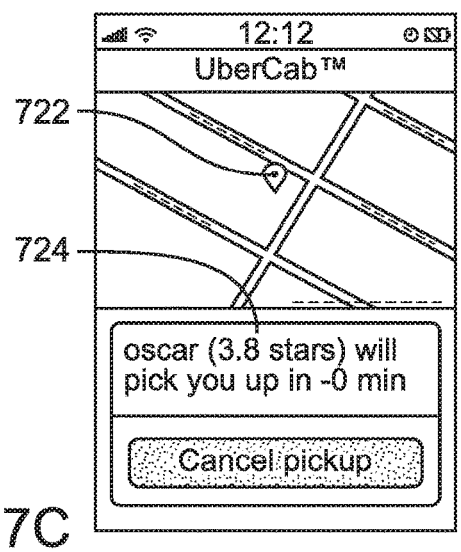
Figure 7D:
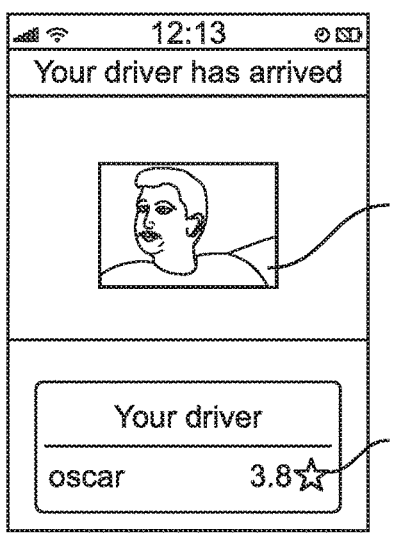
Figure 7E:
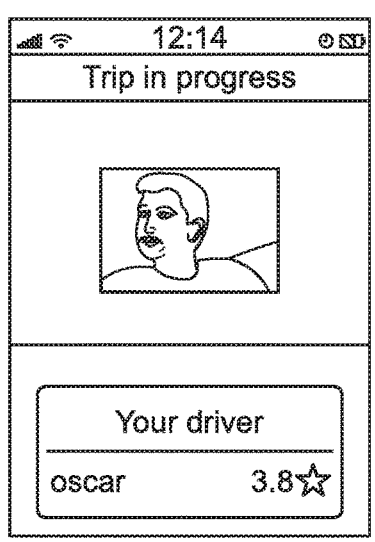
Figure 7F:
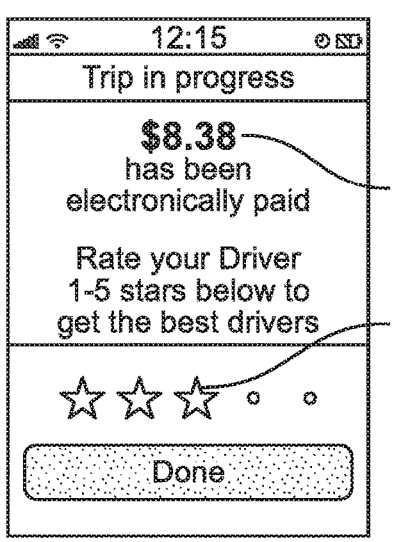

In FIG. 7B through FIG. 7D, progress panels are displayed to the customer. In FIG. 7B, the progress panel informs the customer that a driver is being selected (e.g. by process such as described with an embodiment of FIG. 1). A feature 712 is provided to enable the customer to cancel the pickup. FIG. 7C shows the geographic location 722 and estimated time of arrival 724 of the driver. The panel may be updated as the driver makes its way to the customer, to show how the driver is progressing towards the customer. In FIG. 7D, information about the selected driver/respondent is shown to the user. This may include an image 732 of the driver's face, as well as the rating information 734 associated with the driver. FIG. 7E shows an interface for when the trip is in progress (after-pickup). As a variation, the location of the vehicle in transit may be shown on a map. In FIG. 7F, the customer is provided an interface that includes (i) a feature 742 displaying the fare price (see e.g. FIG. 4 and FIG. 5), and (ii) an input interface 744 to rate the driver.

Figure 8A:
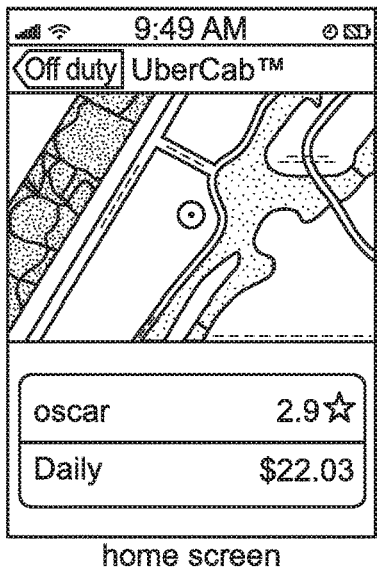
FIG. 8A through FIG. 8F illustrate examples of a series of user-interfaces that are displayed to the driver/respondent when accepting and providing transport to a customer, according to an embodiment.
Figure 8B:
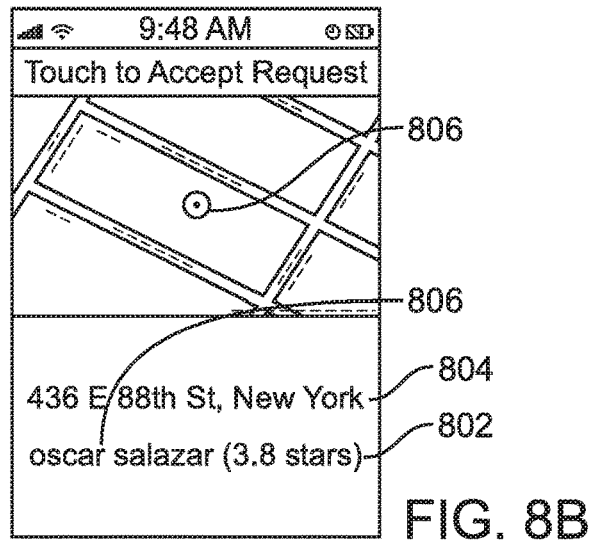

FIG. 8A through FIG. 8F illustrate examples of a series of user-interfaces that are displayed to the driver/respondent, from the time the request for transport is made from the customer. In FIG. 8A and FIG. 8B, the transport request is received by the respondent. Information contained when the driver receives/accepts the transport request include (i) identification of the customer 802, (ii) rating information associated with the customer 804, and (iii) location of the customer 806 (which can be displayed as a map).

Figure 8C:
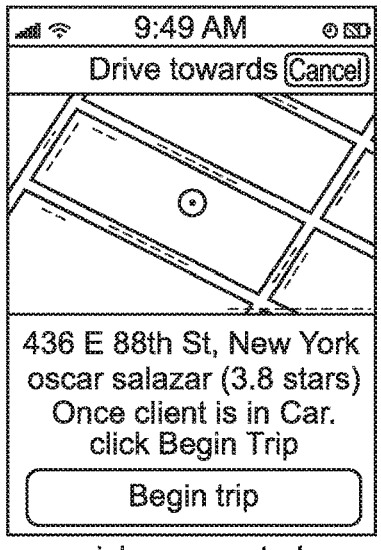
Figure 8D:
Figure 8E:
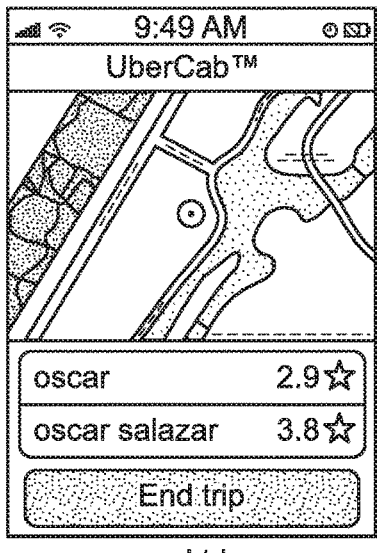
Figure 8F:
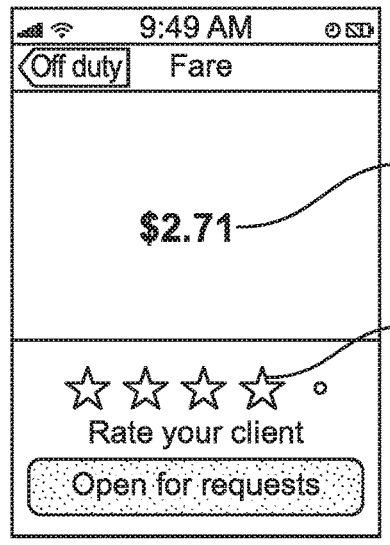

In FIG. 8C through FIG. 8E, the driver/respondent is provided the interface to start the monitoring function of his handset. In one implementation, the driver/respondent is able to operate a soft button 812 to trigger when to start monitoring and when it is to finish. In FIG. 8F, when the fare is finished, the fare amount 822 is displayed to the driver and confirmation may be provided as to the fare amount. The driver is also given the opportunity to provide rating/feedback 832 of the customer.

Although illustrative embodiments have been described in detail herein with reference to the accompanying drawings, variations to specific embodiments and details are encompassed by this disclosure. It is intended that the scope of the invention is defined by the following claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A non-transitory computer-readable medium storing instructions that, when executed by one or more processors of one or more servers, cause the one or more servers to perform operations comprising:

determining a current location of each available vehicle of a plurality of available vehicles, based on location data determined by a corresponding application executing on a corresponding computing device associated with each available vehicle of the plurality of available vehicles, wherein the corresponding application executes to access a location-based resource of the corresponding computing device associated with each available vehicle to provide the location data for determining the current location of the available vehicle;

communicating, over one or more networks, with a user application executing on a mobile computing device of a user, wherein communicating with the user application includes:
  determining a current location of the mobile computing device based on location data determined by the user application via access to a location-based resource of the mobile computing device;
  providing data to the user application executing on the mobile computing device to cause the mobile computing device to generate a map interface displaying a map indicating (i) the current location of the mobile computing device of the user on the map, (ii) the current location of at least one available vehicle of the plurality of available vehicles, and (iii) a predicted response time for a particular vehicle of the plurality of available vehicles to rendezvous with the user, the map interface including a user interface feature from which the user triggers transmission of a transport request to initiate, by the one or more servers, a selection process to assign the transport request to one of the plurality of available vehicles;
  obtaining, from the user application executing on the mobile computing device, the transport request, in response to the user interacting with the user interface feature, the transport request including geographic location information that specifies a pickup location;
in response to the user interacting with the user interface feature and based on the transport request, initiating the selection process by programmatically selecting a selected vehicle from the plurality of available vehicles to be assigned to transport the user, wherein programmatically selecting the selected vehicle includes (i) computing, using map information and the current location of each available vehicle of the plurality of available vehicles, a proximity of individual available vehicles of the plurality of available vehicles from the pickup location based on at least one of distance or time, and (ii) selecting the selected vehicle based, at least in part, on the proximity of each of the plurality of available vehicles;
transmitting, to the corresponding computing device associated with the selected vehicle, an invitation communication comprising the pickup location;
prior to the transport being provided to the user, (i) receiving location information generated by the location-based resource of the computing device associated with the selected vehicle and accessed by the corresponding application executing on the corresponding computing device associated with the selected vehicle, and (ii) providing progress information of the selected vehicle to the mobile computing device of the user; and
upon the user being picked up by the selected vehicle, tracking a route of the selected vehicle from the pickup location to a drop-off location.

2. The non-transitory computer-readable medium of claim 1, wherein the instructions cause the one or more servers to programmatically select the selected vehicle available based, at least in part, on a vehicle class that is a preference of the user.

3. The non-transitory computer-readable medium of claim 1, wherein the progress information includes an indication showing a current geographic location of the selected vehicle in transit on the map displayed on the mobile computing device.

4. The non-transitory computer-readable medium of claim 1, wherein the progress information includes an indication showing an estimated time of arrival of the selected vehicle to the pickup location.

5. The non-transitory computer-readable medium of claim 1, wherein the transport request includes geographic location information that specifies a destination location.

6. The non-transitory computer-readable medium of claim 1, wherein the instructions cause the one or more servers to track the route of the selected vehicle by using information from at least one of (i) the user application to obtain data from the location-based resource of the mobile computing device, or (ii) the corresponding application of the corresponding computing device associated with the selected vehicle to obtain data from the location-based resource of the corresponding computing device associated with the selected vehicle.

7. The non-transitory computer-readable medium of claim 1, wherein the instructions cause the one or more servers to further perform operations comprising:
  determining an amount for providing transport to the user based, at least in part, on the tracked route.

8. The non-transitory computer-readable medium of claim 1, wherein the invitation communication includes information associated with the user that is retrieved from a data store accessible by the one or more servers.

9. The non-transitory computer-readable medium of claim 1, wherein the instructions cause the one or more servers to further perform operations comprising:
  receiving, from the corresponding computing device associated with the selected vehicle, an acceptance communication; and
  transmitting, to the mobile computing device, information about a driver of the selected vehicle, the information about the driver being retrieved from a data store accessible by the one or more servers.

10. The non-transitory computer-readable medium of claim 1, wherein the instructions cause the one or more servers to further perform operations comprising:
  receiving, from the corresponding computing device associated with the selected vehicle, data indicating that the user has been picked up, wherein the data is transmitted from the corresponding computing device associated with the selected vehicle in response to a driver providing input on a user interface feature of the corresponding application of the corresponding computing device of the selected vehicle.

11. A network system comprising:
one or more processors; and
one or more memory resources storing instructions that, when executed by the one or more processors, cause the network system to perform operations comprising:
  determining a current location of each available vehicle of a plurality of available vehicles, based on location data determined by a corresponding application executing on a corresponding computing device associated with a each available vehicle of the plurality of vehicles, wherein the corresponding application executes to access a location-based resource of the corresponding computing device associated with each available vehicle to provide the location data for determining the current location of the available vehicle;
  communicating, over one or more networks, with a user application executing on a mobile computing device of a user, wherein communicating with the user application includes:

determining a current location of the mobile computing device based on location data determined by the user application via access to a location-based resource of the mobile computing device;

providing data to the user application executing on the mobile computing device to cause the mobile computing device to generate a map interface displaying a map indicating i) the current location of the mobile computing device of the user, and (ii) the current location of at least one available vehicle of the plurality of available vehicles, and (iii) a predicted response time for one the plurality of available vehicles to rendezvous with the user, the map interface further including a user interface feature from which the user triggers transmission of a transport request to initiate, by the one or more servers, a selection process to assign the transport request to one of the plurality of available vehicles;

obtaining, from the user application executing on the mobile computing device, the transport request, in response to the user interacting with the user interface feature, the transport request including geographic location information that specifies a pickup location;

in response to the user interacting with the user interface feature and based on the transport request, initiating the selection process by programmatically selecting a selected vehicle from the plurality of available vehicles to be assigned to transport the user, wherein programmatically selecting the selected vehicle includes (i) computing, using map information and the current location of each available vehicle of the plurality of available vehicles, a proximity of individual available vehicles of the plurality of available vehicles from the pickup location based on at least one of distance or time, and (ii) selecting the selected vehicle based, at least in part, on the proximity of the individual available vehicles;

transmitting, to the corresponding computing device associated with the selected vehicle, an invitation communication comprising the pickup location;

prior to the transport being provided to the user, (i) receiving location information generated by the location-based resource of the corresponding computing device associated with the selected vehicle and accessed by the corresponding application executing on the corresponding computing device associated with the selected vehicle, and (ii) providing progress information of the selected vehicle to the mobile computing device of the user; and upon the user being picked up by the selected vehicle, tracking a route of the selected vehicle from the pickup location to a drop-off location.

12. The network system of claim 11, wherein the instructions cause the one or more servers to programmatically select the selected vehicle based, at least in part, on a vehicle class that is a preference of the user.

13. The network system of claim 11, wherein the progress information includes an indication showing a current geographic location of the selected vehicle in transit on the map displayed on the mobile computing device.

14. The network system of claim 11, wherein the progress information includes an indication showing an estimated time of arrival of the selected vehicle to the pickup location.

15. The network system of claim 11, wherein the transport request includes geographic location information that specifies a destination location.

16. The network system of claim 11, wherein the instructions cause the one or more servers to track the route of the selected vehicle by using information from at least one of (i) the user application to obtain data from the location-based resource of the mobile computing device, or (ii) the corresponding application of the corresponding computing device associated with the selected vehicle to obtain data from the location-based resource of the corresponding computing device associated with the selected vehicle.

17. The network system of claim 11, wherein the instructions cause the one or more servers to further perform operations comprising:

determining an amount for providing transport to the user based, at least in part, on the tracked route.

18. The network system of claim 11, wherein the invitation communication includes information associated with the user that is retrieved from a data store accessible by the one or more servers.

19. The network system of claim 11, wherein the instructions cause the one or more servers to further perform operations comprising:

receiving, from the corresponding computing device associated with the selected vehicle, an acceptance communication; and transmitting, to the mobile computing device, information about a driver of the selected vehicle, the information about the driver being retrieved from a data store accessible by the one or more servers.

20. The network system of claim 11, wherein the instructions cause the one or more servers to further perform operations comprising:

receiving, from the corresponding computing device associated with the selected vehicle, data indicating that the user has been picked up, wherein the data is transmitted from the corresponding computing device associated with the selected vehicle in response to a driver providing input on a user interface feature of the corresponding application of the corresponding computing device of the selected vehicle.

* * * * *